(12) United States Patent
Yin et al.

(10) Patent No.: US 10,017,400 B2
(45) Date of Patent: Jul. 10, 2018

(54) PROCESS AND APPARATUS FOR MULTIVALENT ION DESALINATION

(71) Applicant: Saltworks Technologies Inc., Richmond (CA)

(72) Inventors: Xiangchun Yin, Richmond (CA); Malcolm Man, Richmond (CA); Benjamin Sparrow, Richmond (CA)

(73) Assignee: Saltworks Technologies Inc., Richmond, BC (CA)

( * ) Notice: Subject to any disclaimer, the term of this patent is extended or adjusted under 35 U.S.C. 154(b) by 0 days.

(21) Appl. No.: 15/326,279

(22) PCT Filed: Apr. 7, 2016

(86) PCT No.: PCT/CA2016/050398
§ 371 (c)(1),
(2) Date: Jan. 13, 2017

(87) PCT Pub. No.: WO2016/161511
PCT Pub. Date: Oct. 13, 2016

(65) Prior Publication Data
US 2017/0210644 A1    Jul. 27, 2017

Related U.S. Application Data

(60) Provisional application No. 62/143,918, filed on Apr. 7, 2015.

(51) Int. Cl.
*B01D 61/44* (2006.01)
*C02F 1/469* (2006.01)
(Continued)

(52) U.S. Cl.
CPC ............ *C02F 1/4693* (2013.01); *B01D 61/46* (2013.01); *B01D 61/54* (2013.01); *C02F 1/4604* (2013.01);
(Continued)

(58) Field of Classification Search
CPC .............. C02F 1/4614; C02F 1/4604; C02F 2201/4614; C02F 2201/46115;
(Continued)

(56) References Cited

U.S. PATENT DOCUMENTS

| 5,376,250 A | 12/1994 | Hamano |
| 7,459,088 B2 | 12/2008 | Davis |

(Continued)

FOREIGN PATENT DOCUMENTS

| WO | WO 2006/031732 A2 | 3/2006 |
| WO | WO 2010/115287 A1 | 10/2010 |

(Continued)

*Primary Examiner* — Arun S Phasge
(74) *Attorney, Agent, or Firm* — Klarquist Sparkman, LLP

(57) ABSTRACT

Processes, systems, and techniques for multivalent ion desalination of a feed water use an apparatus that has a cathode, an anode, and an electrodialysis cell located between the cathode and anode. The cell has a product chamber through which the feed water flows, a multivalent cation concentrating chamber on a cathodic side of the product chamber through which the concentrated multivalent cation solution flows, and a multivalent anion concentrating chamber on an anodic side of the product chamber through which the concentrated multivalent anion solution flows. The product chamber and the multivalent cation concentrating chamber are each bounded by and share a cation exchange membrane, and the product chamber and the multivalent anion concentrating chamber are each bounded by and share an anion exchange membrane. A monovalent ion species is added to at least one of the concentrated multivalent cation solution and the concentrated multivalent anion solution.

32 Claims, 6 Drawing Sheets

(51) Int. Cl.
  *C02F 1/46* (2006.01)
  *B01D 61/46* (2006.01)
  *B01D 61/54* (2006.01)
  *C02F 103/08* (2006.01)

(52) U.S. Cl.
  CPC .... *B01D 2311/12* (2013.01); *B01D 2313/345* (2013.01); *C02F 2103/08* (2013.01); *C02F 2201/4614* (2013.01); *C02F 2201/46115* (2013.01)

(58) Field of Classification Search
  CPC ..... C02F 2103/08; B01D 61/54; B01D 61/46; B01D 2313/345; B01D 2311/12
  See application file for complete search history.

(56) References Cited

U.S. PATENT DOCUMENTS

2013/0068620 A1  3/2013  Moe
2016/0002082 A1* 1/2016  Yin .................. C02F 1/441
                                                210/638

FOREIGN PATENT DOCUMENTS

| WO | WO 2013/037047 A1 | 3/2013 |
| WO | WO 2013/074231 A1 | 5/2013 |
| WO | WO 2014/134734 A1 | 9/2014 |
| WO | WO 2014/197966 A1 | 12/2014 |

* cited by examiner

PROCESS AND APPARATUS FOR MULTIVALENT ION DESALINATION

CROSS REFERENCE TO RELATED APPLICATIONS

This is the U.S. National Stage of International Application No. PCT/CA2016/050398, filed Apr. 7, 2016, which was published in English under PCT Article 21(2), which in turn claims the benefit of U.S. Provisional Application No. 62/143,918, filed Apr. 7, 2015. The provisional application is incorporated herein in its entirety.

TECHNICAL FIELD

The present disclosure is directed at methods, systems, and techniques for multivalent ion desalination.

BACKGROUND

Desalination is being increasingly practiced to produce freshwater from saltwater. The most commonly practiced desalination processes are reverse osmosis ("RO"), nanofiltration ("NF"), thermal desalination, and electrodialysis ("ED") or electrodialysis reversal ("EDR"). In RO, water is forced through a membrane that rejects salts and allows water flux under pressures exceeding the osmotic pressure. NF is similar to RO, although NF produces a permeate richer in salts of monovalent ions than RO permeate. In thermal desalination, water is evaporated and then condensed, sometimes in multiple stages, in order to recycle the latent heat of condensation.

ED and EDR are water treatment processes that transfer salt ions across ion exchange membranes under the action of a galvanic potential. Conventional ED is typically performed using an electrodialysis stack comprising alternating anion exchange membranes and cation exchange membranes between two electrodes (an anode and a cathode). The galvanic potential is supplied as a voltage generated at the electrodes. Typical industrial ED stacks comprise two sets of chambers: product chambers and concentrate chambers. One water source is typically used to feed a product circuit and a concentrate circuit, which respectively comprise the product chambers and the concentrate chambers. During stack operation salts are transferred from the product to the concentrate chambers. Desalinated product water is recovered and the concentrate is eventually discharged as a waste.

SUMMARY

According to a first aspect, there is provided a process for multivalent ion desalination. The process comprises directing a feed water, a concentrated multivalent cation solution, and a concentrated multivalent anion solution through an apparatus, and adding a monovalent ion species to at least one of the concentrated multivalent cation solution and the concentrated multivalent anion solution. The apparatus comprises a cathode and an anode; and an electrodialysis cell located between the cathode and the anode, wherein the cell comprises a product chamber, a multivalent cation concentrating chamber on a cathodic side of the product chamber, and a multivalent anion concentrating chamber on an anodic side of the product chamber. The product chamber and the multivalent cation concentrating chamber are each bounded by and share a cation exchange membrane and the product chamber and the multivalent anion concentrating chamber are each bounded by and share an anion exchange membrane. The feed water flows through the product chamber, the concentrated multivalent cation solution flows through the multivalent cation concentrating chamber, and the concentrated multivalent anion solution flows through the multivalent anion concentrating chamber.

The concentration of the monovalent ion species in the at least one of the concentrated multivalent cation and the concentrated multivalent anion solutions may be kept above 500 mg/L.

The apparatus may comprise multiple electrodialysis cells, with each of the cells comprising a cathodic and an anodic cell end ion exchange membrane respectively bounding a cathodic and an anodic end of the cell. At least two of the cells may be bounded by and share one of the cell end ion exchange membranes, and the cell end ion exchange membranes of the at least two of the cells may be identical types of ion exchange membranes.

Each of the cell end ion exchange membranes may be a monovalent ion permselective ion exchange membrane.

Each of the cell end ion exchange membranes may be a monovalent anion permselective ion exchange membrane.

At least one of the cells may further comprise a cell transfer solution chamber located on a cathodic side of the multivalent cation concentrating chamber, and an anion exchange membrane that bounds a cathodic side of the multivalent cation concentrating chamber. The cell transfer solution chamber may be bounded on a cathodic side by one of the cell end monovalent anion permselective ion exchange membranes and on an anodic side by the anion exchange membrane that also bounds the cathodic side of the multivalent cation concentrating chamber. The process may further comprise directing a transfer solution comprising a monovalent ion species through the cell transfer solution chamber.

At least one of the cells may further comprise a cell transfer solution chamber located on a cathodic side of the multivalent cation concentrating chamber, and a monovalent anion permselective ion exchange membrane that bounds a cathodic side of the multivalent cation concentrating chamber. The cell transfer solution chamber may be bounded on a cathodic side by one of the cell end monovalent anion permselective ion exchange membranes and on an anodic side by the monovalent anion permselective exchange membrane that also bounds the cathodic side of the multivalent cation concentrating chamber. The process may further comprise directing a transfer solution comprising a monovalent ion species through the cell transfer solution chamber.

Each of the cell end ion exchange membranes may be a monovalent cation permselective ion exchange membrane.

At least one of the cells may further comprise a cell transfer solution chamber located on an anodic side of the multivalent anion concentrating chamber, and a cation exchange membrane that bounds an anodic side of the multivalent anion concentrating chamber. The cell transfer solution chamber may be bounded on an anodic side by one of the cell end monovalent cation permselective ion exchange membranes and on a cathodic side by the cation exchange membrane that also bounds the anodic side of the multivalent anion concentrating chamber. The process may further comprise directing a transfer solution comprising a monovalent ion species through the cell transfer solution chamber.

At least one of the cells may further comprise a cell transfer solution chamber located on an anodic side of the multivalent anion concentrating chamber, and a monovalent cation permselective ion exchange membrane that bounds an anodic side of the multivalent anion concentrating chamber. The cell transfer solution chamber may be bounded on an anodic side by one of the cell end monovalent cation permselective ion exchange membranes and on a cathodic side by the monovalent cation permselective ion exchange membrane that also bounds the anodic side of the multivalent anion concentrating chamber. The process may further comprise directing a transfer solution comprising a monovalent ion species through the cell transfer solution chamber.

Each of the cell end ion exchange membranes may be an anion exchange membrane, and at least one of the cells may further comprise a cell transfer solution chamber located on an anodic side of the multivalent anion concentrating chamber, and a monovalent anion permselective ion exchange membrane that bounds an anodic side of the multivalent anion concentrating chamber. The cell transfer solution chamber may be bounded on an anodic side by the anodic cell end anion exchange membrane and on a cathodic side by the monovalent anion permselective ion exchange membrane that also bounds the anodic side of the multivalent anion concentrating chamber. The process may further comprise directing a transfer solution comprising a monovalent ion species through the cell transfer solution chamber.

Each of the cell end ion exchange membranes may be a cation exchange membrane, and at least one of the cells may further comprise a cell transfer solution chamber located on a cathodic side of the multivalent cation concentrating chamber, and a monovalent cation permselective ion exchange membrane that bounds a cathodic side of the multivalent cation concentrating chamber. The cell transfer solution chamber may be bounded on a cathodic side by the cathodic cell end cation exchange membrane and on an anodic side by the monovalent cation permselective ion exchange membrane that also bounds the cathodic side of the multivalent cation concentrating chamber. The process may further comprise directing a transfer solution comprising a monovalent ion species through the cell transfer solution chamber.

The process may further comprise precipitating multivalent ion species and producing a saltwater comprising monovalent ion species and multivalent ions from the concentrated multivalent cation solution and the concentrated multivalent anion solution exiting the multivalent cation concentrating chamber and the multivalent anion concentrating chamber, respectively.

The process may further comprise recovering monovalent ion species using a monovalent ion species-recovering electrodialysis stack by (i) directing the saltwater comprising monovalent ion species- and multivalent ions to the monovalent ion species-recovering stack; (ii) directing a saltwater without one or both of multivalent cations and multivalent anions to the monovalent ion species-recovering stack; (iii) outputting a monovalent ion brine comprising monovalent ion species from the monovalent ion species-recovering stack; and (iv) outputting a multivalent ion brine comprising multivalent ion; and adding the monovalent ion brine to one of the concentrated multivalent cation solution and the concentrated multivalent anion solution.

The process may further comprise desalinating via a desalination subsystem one or both of the feed water and a product water that exits the apparatus and that the apparatus generates by desalinating the feed water.

The process may further comprise obtaining an electrical resistance measurement that represents an electrical resistance between the anode and cathode, determining whether the electrical resistance exceeds a monovalent ion species addition threshold, and when the electrical resistance measurement exceeds the monovalent ion species addition threshold, increasing a concentration of the monovalent ion species in at least one of the concentrating chambers of the apparatus.

According to another aspect, there is provided a system for multivalent ion desalination. The system comprises an apparatus, which comprises a cathode and an anode and an electrodialysis cell located between the cathode and the anode. The cell comprises a product chamber for receiving feed water, a multivalent cation concentrating chamber on a cathodic side of the product chamber, and a multivalent anion concentrating chamber on an anodic side of the product chamber. The product chamber and the multivalent cation concentrating chamber are each bounded by and share a cation exchange membrane and the product chamber and the multivalent anion concentrating chamber are each bounded by and share an anion exchange membrane. The system also comprises a monovalent ion species addition subsystem that is fluidly coupled to and that adds a monovalent ion species to at least one of the multivalent cation and multivalent anion concentrating chambers of the apparatus.

The monovalent species addition subsystem may keep a concentration of the monovalent ion species in the at least one of the multivalent cation and multivalent anion concentrating chambers above 500 mg/L.

The apparatus may comprise multiple electrodialysis cells, and each of the cells may comprise a cathodic and an anodic cell end ion exchange membrane respectively bounding a cathodic and an anodic end of the cell. At least two of the cells may be bounded by and share one of the cell end ion exchange membranes, and the cell end ion exchange membranes of the at least two of the cells may be identical types of ion exchange membranes.

Each of the cell end ion exchange membranes may be a monovalent ion permselective ion exchange membrane.

Each of the cell end ion exchange membranes may be a monovalent anion permselective ion exchange membrane.

At least one of the cells may further comprise a cell transfer solution chamber located on a cathodic side of the multivalent cation concentrating chamber, and an anion exchange membrane that bounds a cathodic side of the multivalent cation concentrating chamber. The cell transfer solution chamber may be bounded on a cathodic side by one of the cell end monovalent anion permselective ion exchange membranes and on an anodic side by the anion exchange membrane that also bounds the cathodic side of the multivalent cation concentrating chamber.

At least one of the cells may further comprise a cell transfer solution chamber located on a cathodic side of the multivalent cation concentrating chamber, and a monovalent anion permselective ion exchange membrane that bounds a cathodic side of the multivalent cation concentrating chamber. The cell transfer solution chamber may be bounded on a cathodic side by one of the cell end monovalent anion permselective ion exchange membranes and on an anodic side by the monovalent anion permselective ion exchange membrane that also bounds the cathodic side of the multivalent cation concentrating chamber.

Each of the cell end ion exchange membranes may be a monovalent cation permselective ion exchange membrane.

At least one of the cells may further comprise a cell transfer solution chamber located on an anodic side of the multivalent anion concentrating chamber, and a cation exchange membrane that bounds an anodic side of the multivalent anion concentrating chamber. The cell transfer solution chamber may be bounded on an anodic side by one of the cell end monovalent cation permselective ion exchange membranes and on a cathodic side by the cation exchange membrane that also bounds the anodic side of the multivalent anion concentrating chamber.

At least one of the cells may further comprise a cell transfer solution chamber located on an anodic side of the multivalent anion concentrating chamber, and a monovalent cation permselective ion exchange membrane that bounds an anodic side of the multivalent anion concentrating chamber. The cell transfer solution chamber may be bounded on an anodic side by one of the cell end monovalent cation permselective ion exchange membranes and on a cathodic side by the monovalent cation permselective ion exchange membrane that also bounds the anodic side of the multivalent anion concentrating chamber.

Each of the cell end ion exchange membranes may be an anion exchange membrane, and at least one of the cells may further comprise a cell transfer solution chamber located on an anodic side of the multivalent anion concentrating chamber, and a monovalent anion permselective ion exchange membrane that bounds an anodic side of the multivalent anion concentrating chamber. The cell transfer solution chamber may be bounded on an anodic side by the anodic cell end anion exchange membrane and on a cathodic side by the monovalent anion permselective ion exchange membrane that also bounds the anodic side of the multivalent anion concentrating chamber.

Each of the cell end ion exchange membranes may be a cation exchange membrane, and at least one of the cells may further comprise a cell transfer solution chamber located on a cathodic side of the multivalent cation concentrating chamber, and a monovalent cation permselective ion exchange membrane that bounds a cathodic side of the multivalent cation concentrating chamber. The cell transfer solution chamber nay be bounded on a cathodic side by the cathodic cell end cation exchange membrane and on an anodic side by the monovalent cation permselective ion exchange membrane that also bounds the cathodic side of the multivalent cation concentrating chamber.

The system may further comprise a salt precipitating subsystem fluidly coupled to the multivalent anion concentrating chamber and the multivalent cation concentrating chamber of the apparatus. The salt precipitating subsystem may precipitate multivalent ion species and produce a saltwater comprising monovalent ion species and multivalent ions from solutions received from the concentrated multivalent anion and cation chambers of the apparatus.

The system may further comprise a monovalent ion species-recovering stack fluidly coupled to the salt precipitating subsystem to receive the saltwater comprising monovalent ion species and multivalent ions and to a solution without one or both of multivalent cations and multivalent anions. The monovalent ion species recovering stack may output a monovalent ion brine comprising monovalent ion species and a multivalent ion brine comprising multivalent ions, and the monovalent ion brine may be directed to one of the multivalent cation and multivalent anion concentrating chambers.

The system may further comprise a desalination subsystem fluidly coupled to the product chamber to desalinate one or both of the feed water and a product water that exits the apparatus and that the apparatus generates by desalinating the feed water.

The system may further comprise an ohmmeter electrically coupled between the anode and the cathode, a processor communicatively coupled to the ohmmeter and to the monovalent ion species addition subsystem, and a non-transitory computer readable medium communicatively coupled to the processor and having stored thereon program code that is executable by the processor and that, when executed by the processor, causes the processor to receive an electrical resistance measurement from the ohmmeter determine whether the electrical resistance measurement exceeds a monovalent ion species addition threshold, and when the electrical resistance measurement exceeds the monovalent ion species addition threshold, send a signal to the monovalent ion species addition subsystem that causes the monovalent ion species addition subsystem to increase a concentration of the monovalent ion species in at least one of the concentrating chambers of the apparatus.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
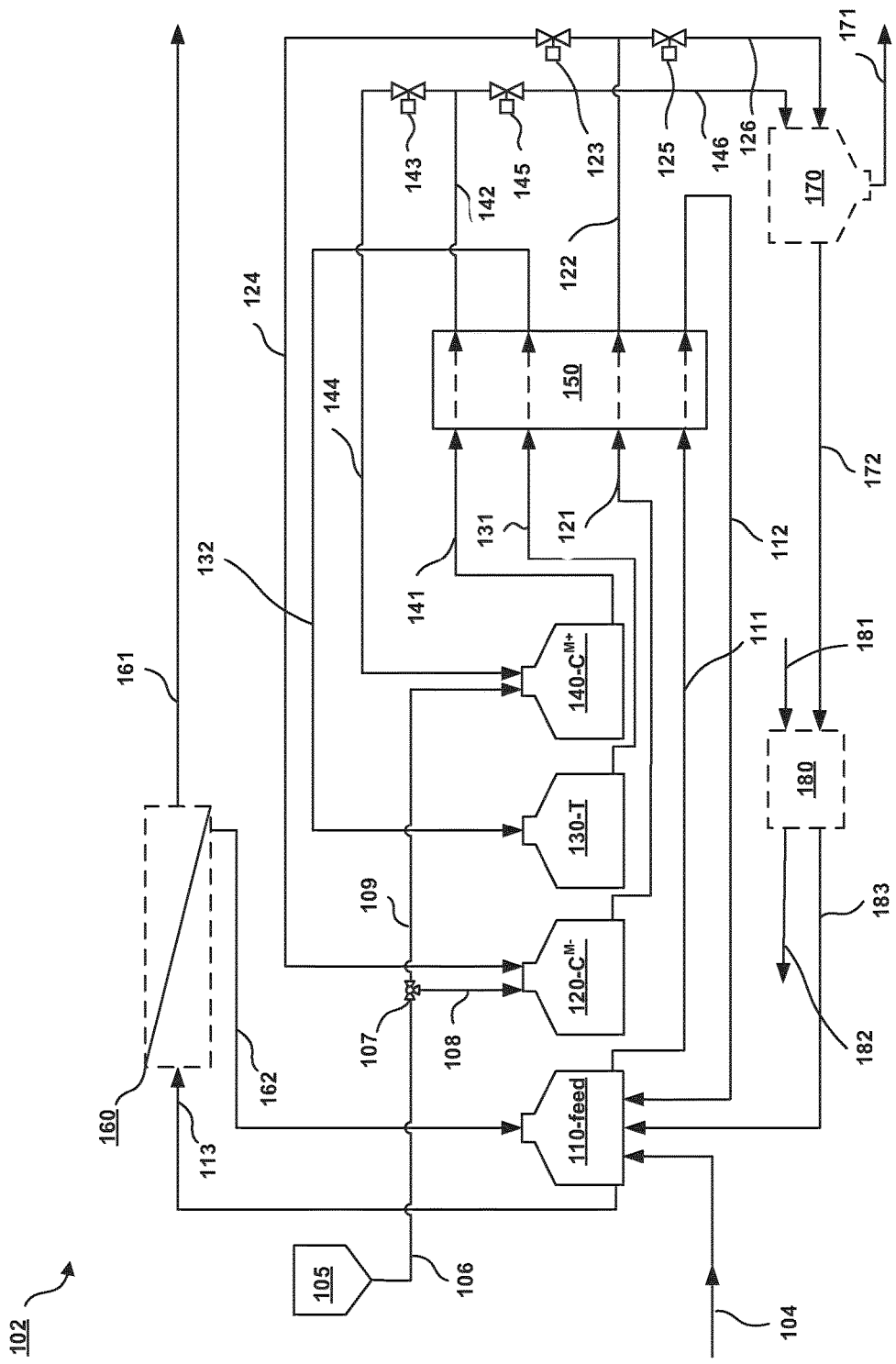
FIG. 1 shows a schematic of one example embodiment of a desalination system comprising an apparatus for multivalent ion desalination in the form of an electrodialysis stack.

As used in this disclosure:
1. "Multivalent ion species" refers to dissolved and solid salt compounds comprising multivalent cations and multivalent anions.
2. "Monovalent ion species" refers to dissolved and solid salt or acid compounds comprising monovalent cations and monovalent anions.
3. A "monovalent and multivalent ion permselective ion exchange membrane" refers to an ion exchange membrane that is permeable to either cations (whether monovalent or multivalent" or anions (whether monovalent or multivalent). Unless otherwise indicated herein, a reference to a "cation exchange membrane" is a reference to a monovalent and multivalent cation permselective ion exchange membrane, and a reference to an "anion exchange membrane" is a reference to a monovalent and multivalent anion permselective ion exchange membrane.

4. "Monovalent anion permselective ion exchange membrane" refers to an anion exchange membrane that is permeable to monovalent anions, substantially less permeable to multivalent anions, and that is substantially impermeable to, and that in some embodiments and depending on operating conditions entirely rejects, cations (whether multivalent or monovalent). "Substantially less permeable" refers to the permeability ratio of monovalent anions to multivalent anions under the same concentrations being greater than 1, preferably being greater than 5, and more preferably being greater than 10.

5. "Monovalent cation permselective ion exchange membrane" refers to a cation exchange membrane that is permeable to monovalent cations, substantially less permeable to multivalent cations, and that is substantially impermeable to, and that in some embodiments and depending on operating conditions entirely rejects, anions (whether multivalent or monovalent). "Substantially less permeable" refers to the permeability ratio of monovalent cations to multivalent cations under the same concentrations being greater than 1, preferably being greater than 5, and more preferably being greater than 10.

6. "Monovalent ion permselective ion exchange membrane" refers to a monovalent cation permselective ion exchange membrane or a monovalent anion permselective ion exchange membrane.

7. As used in this disclosure and in FIGS. 1 to 6:
   (a) "$1^+$" refers to monovalent cations.
   (b) "$1^-$" refers to monovalent anions.
   (c) "$M^+$" refers to multivalent cations.
   (d) "$M^-$" refers to multivalent anions.
   (e) "E" refers to an electrolyte solution.
   (f) "T" refers to a transfer solution.
   (g) "$C^{M+}$" refers to a saltwater solution where multivalent cations are concentrated (this solution is hereinafter interchangeably referred to as the "concentrated multivalent cation solution").
   (h) "$C^{M-}$" refers to a saltwater solution where multivalent anions are concentrated (this solution is hereinafter interchangeably referred to as the "concentrated multivalent anion solution").
   (i) "P" refers to at least partially desalinated product water, which is generated from feed water during electrodialysis.
   (j) "C" refers to a concentrated saltwater solution, which is generated during electrodialysis.

Water recovery of a desalination process is mostly limited by water chemistry instead of the physical characteristics of the desalination process. Inland brackish and industrial saltwater are often high in scaling multivalent ion species comprising multivalent cations such as $Ca^{2+}$, $Mg^{2+}$, and $Ba^{2+}$, and associated multivalent anions such as $SO_4^{2-}$ and $CO_3^{2-}$. The multivalent ion species may have solubility of less than 0.1 wt %. This implies that they can precipitate at low concentrations, limit recovery, and consequently cause a scaling problem for desalination systems. In some applications, highly soluble monovalent ionic species, such as NaCl, may not even be the major salt species. Current approaches to addressing this scaling problem include pretreatment of the feed water with an ion exchange unit where scaling multivalent ions such as $Ca^{2+}$ and $SO_4^{2-}$ are first removed. However, an ion exchange unit is used as part of a batch process and requires considerable maintenance, including the frequent usage of sodium chloride or hydrochloric acid to regenerate ion exchange resins. This maintenance adds costs and technical difficulty to the desalination process. An alternative approach to mitigating scaling problems associated with multivalent ion species is to remove multivalent cations and multivalent anions in separate steps during a desalination process.

Embodiments described herein are directed to a desalination process and system to desalinate saltwater such as industrial saltwater and inland brackish water, which are typically rich in sparingly soluble multivalent ion species such as $CaSO_4$, $Ca_3(PO_4)_2$, and $CaCO_3$, and which may scale desalination equipment.

In some embodiments, the desalination process comprises using an electrodialysis apparatus in the form of a stack, and effectively desalinates, at >95% water-recovery, saltwater containing scaling multivalent ion species. More particularly, in certain embodiments the stack comprises one of monovalent anion permselective ion exchange membranes and monovalent cation permselective ion exchange membranes, and the electrodialysis apparatus desalinates sparingly soluble multivalent ion species from feed water and converts them into non-scaling salts of monovalent-multivalent pairs.

FIG. 1 shows a schematic of one embodiment of a desalination system 102 for multivalent ion desalination. In the depicted embodiment, the desalination system 102 desalinates saltwater containing multivalent ion species. The desalination system 102 comprises an apparatus in the form of an electrodialysis stack 150 used to desalinate input saltwater, hereinafter referred to as "feed water", so that the concentrations of the multivalent ion species in the feed water decrease, thereby desalinating the feed water and generating a product water. As used herein, "desalination" of the feed water refers to removing salt ions, whether monovalent or multivalent, from the feed water, and includes scenarios in which not all of the salt ions are removed from the feed water. The product water then exits the electrodialysis stack 150.

Four different fluid circuits are present in FIG. 1: a feed water circuit; a $C^{M+}$ circuit; a $C^{M-}$ circuit; and a transfer solution circuit. The feed water circuit comprises a feed tank 110 and is fluidly coupled to an inlet and an outlet of at least one P chamber of the stack 150; the $C^{M+}$ circuit comprises a concentrated multivalent cation solution tank 140 and is fluidly coupled to an inlet and an outlet of at least one $C^{M+}$ chamber of the stack 150; the $C^{M-}$ circuit comprises a concentrated multivalent anion solution tank 120 and is fluidly coupled to an inlet and an outlet of at least one $C^{M-}$ chamber of the stack 150; and the transfer solution circuit comprises a transfer solution tank 130 and is fluidly coupled to an inlet and an outlet of at least one T chamber of the stack 150. As discussed in more detail below in respect of FIGS. 2 to 5, while the stack 150 is being used for desalination, the feed water is pumped from the feed tank 110 and through the P chambers of the stack 150, $C^{M+}$ is pumped from the $C^{M+}$ tank 140 and through the $C^{M+}$ chambers of the stack 150, $C^{M-}$ is pumped from the $C^{M-}$ tank 120 and through the $C^{M-}$ chambers of the stack 150, and the transfer solution is pumped from the T tank 130 and through the T chambers of the stack 150. The structure and operation of the stack 150 is discussed in more detail in respect of FIGS. 2 to 5, below.

Figure 2:
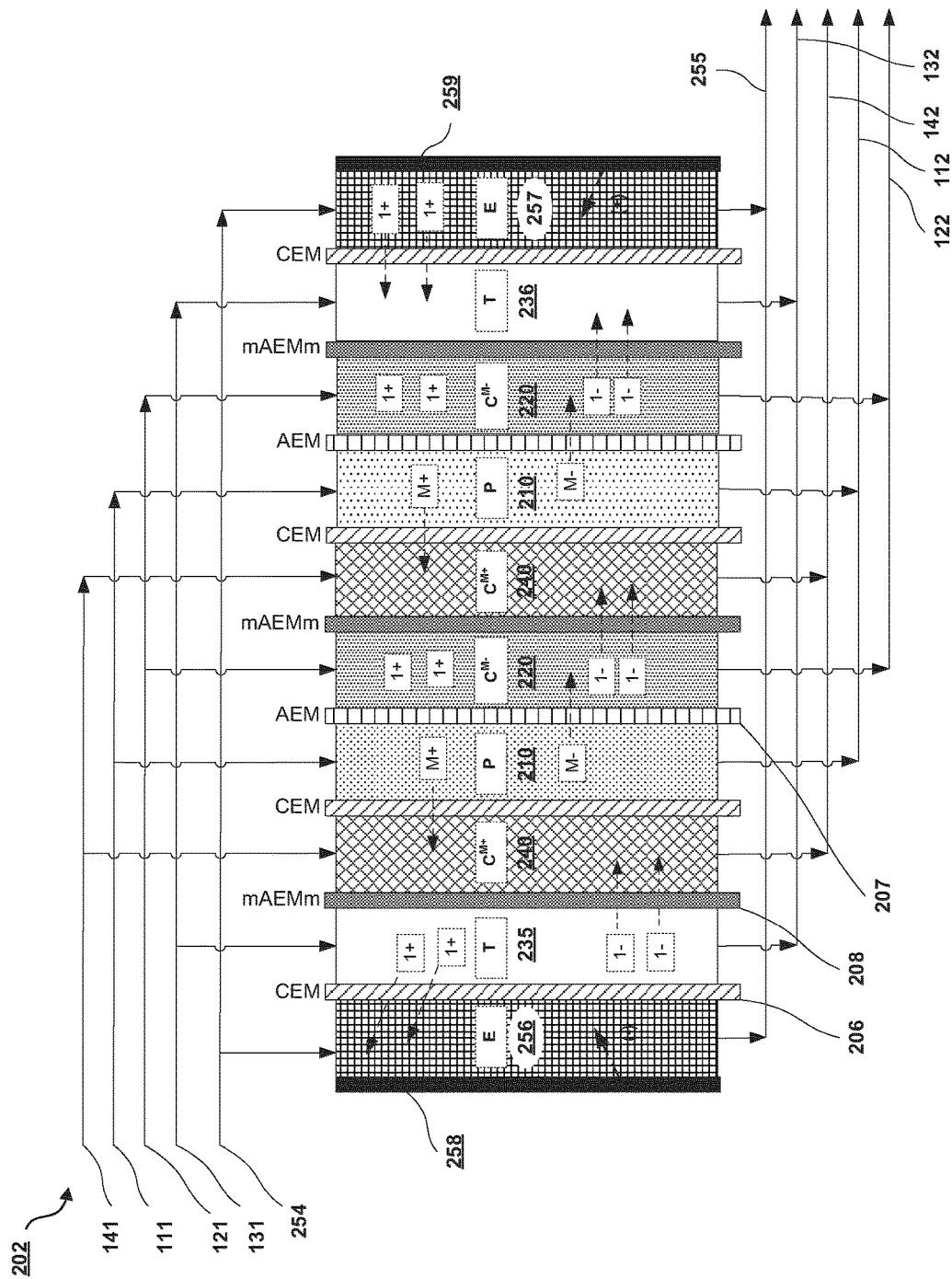
FIG. 2 shows a schematic of an example electrodialysis stack, comprising monovalent anion permselective ion exchange membranes, which may be used as the stack of FIG. 1.
Figure 3:
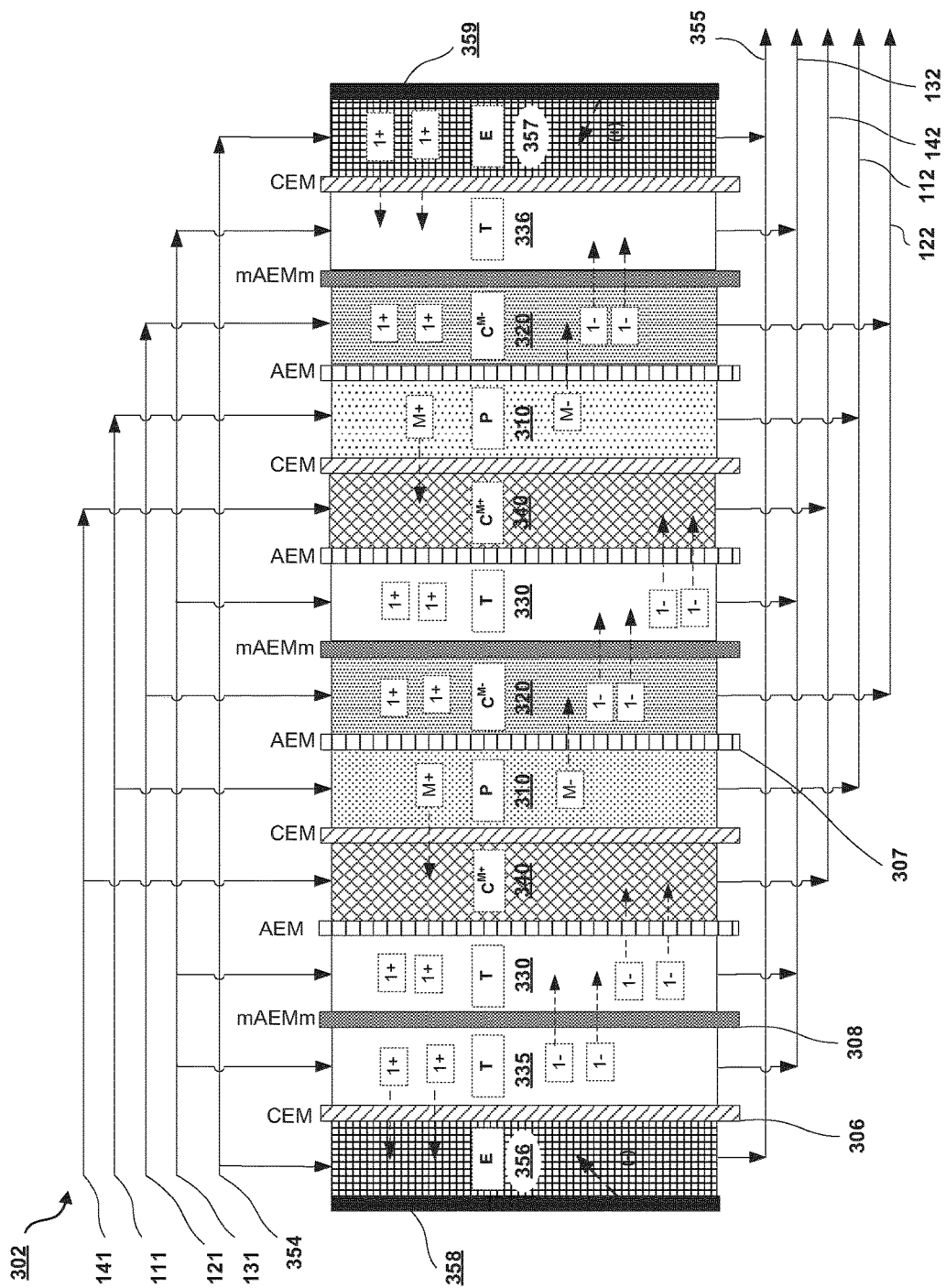
FIG. 3 shows a schematic of an example electrodialysis stack, comprising monovalent anion permselective ion exchange membranes and a cell transfer chamber in each electrodialysis cell of the stack, which may be used as the stack of FIG. 1.
Figure 4:
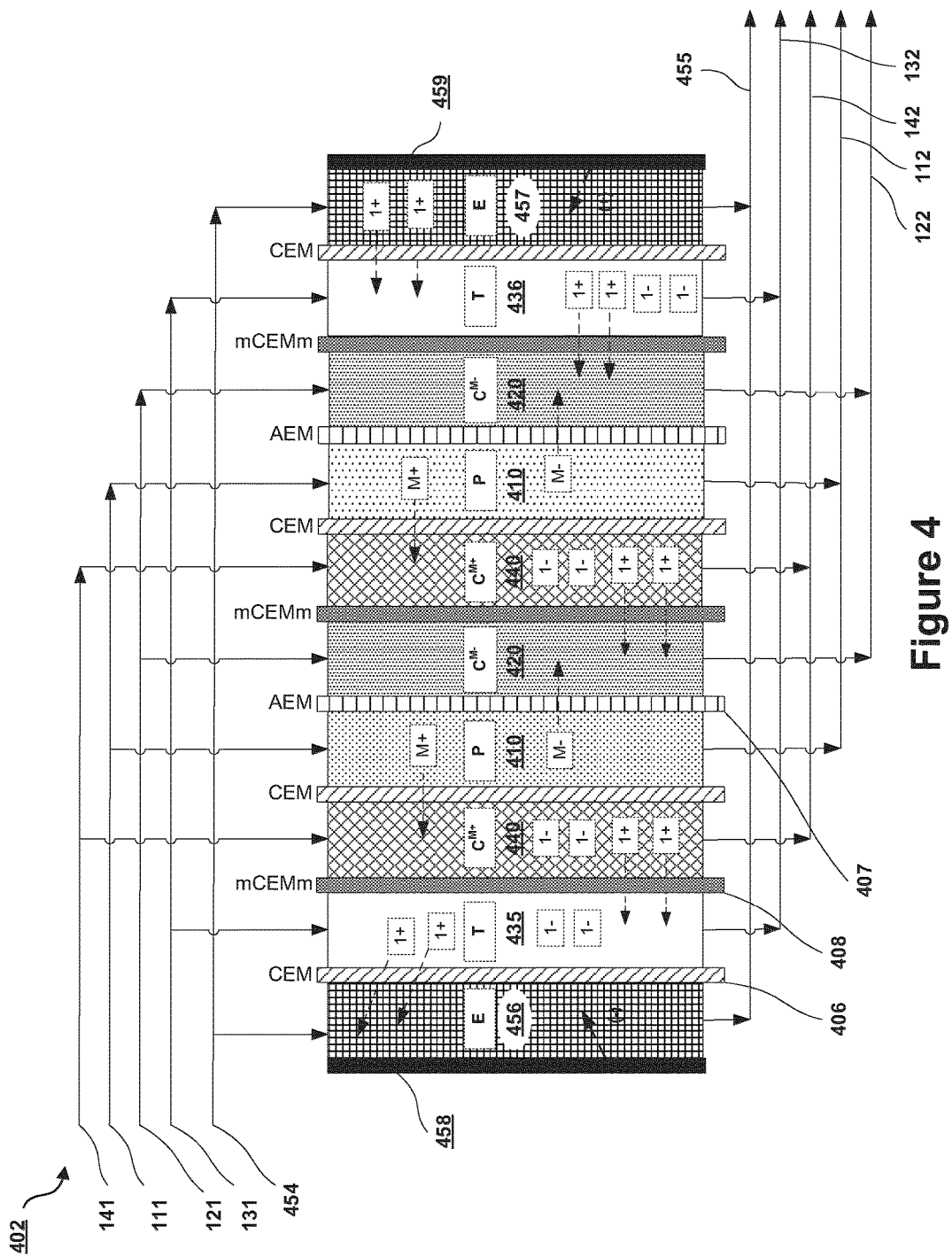
FIG. 4 shows a schematic of an example electrodialysis stack, comprising monovalent cation permselective ion exchange membranes, which may be used as the stack of FIG. 1.
Figure 5:
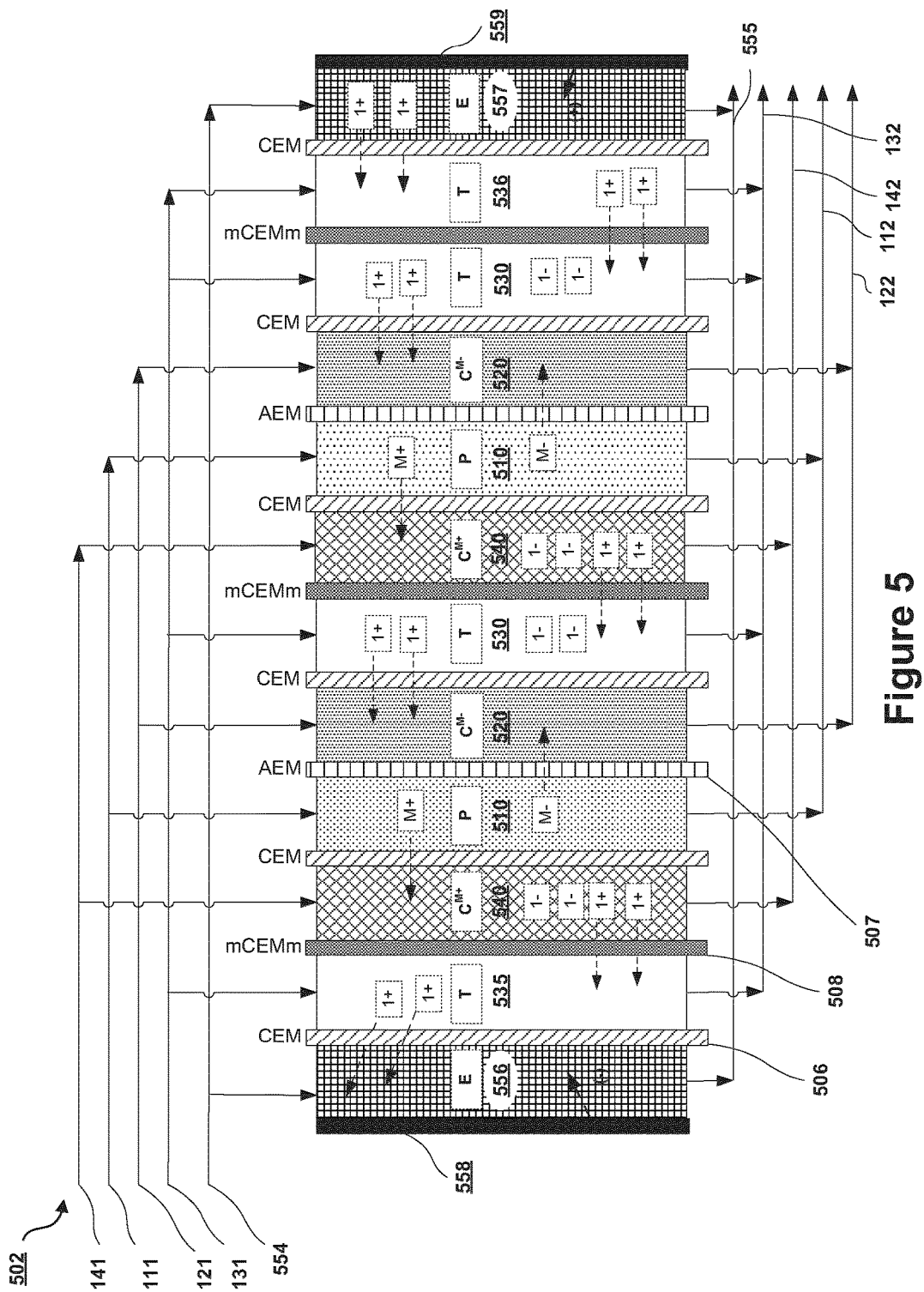
FIG. 5 shows a schematic of an example electrodialysis stack, comprising monovalent cation permselective ion exchange membranes and a cell transfer chamber in each electrodialysis cell of the stack, which may be used as the stack of FIG. 1.

The desalination system 102 also comprises a monovalent ion species addition subsystem 105 that supplies via conduits 106,108,109 and a control valve 107 at least one type of monovalent ion species (for example, one or both of NaCl and HCl) to the $C^{M-}$ circuit (such as by adding the monovalent ion species to the concentrated multivalent anion tank 120) when the stack 150 of FIG. 2 or 3 is used, and to the $C^{M+}$ circuit (such as by adding the monovalent ion species to the concentrated multivalent cation tank 140) when the stack 150 of FIG. 4 or 5 is used. As discussed in further detail below, the level of monovalent ion species, which comprises at least one of monovalent salts and monovalent acids, added to system 102 is selected so that the monovalent ion species in at least one of the stack's 150 $C^{M-}$ and $C^{M+}$ chambers is sufficiently high (e.g., above 500 mg/l, preferably above 1,000 mg/l and, more preferably above 2,000 mg/l) to permit an ionic current to be conducted. This allows the stack 150 to convert sparingly soluble multivalent ion species into two highly soluble salts: i) a salt of multivalent cation and monovalent anions in the $C^{M+}$ chambers and circuit, and ii) a salt of monovalent cations and multivalent anion in the $C^{M-}$ chambers and circuit. While in FIG. 1 the monovalent ion species addition subsystem 105 supplies the monovalent ion species indirectly to one or both of the $C^{M+}$ and $C^{M-}$ chambers by adding the monovalent ion species to one or both of the tanks 120,140 or elsewhere in one or both of the $C^{M+}$ and $C^{M-}$ circuits removed from the stack 150, in different embodiments (not depicted) the monovalent ion species addition subsystem 105 may add the monovalent ion species directly to one or both of the $C^{M+}$ and $C^{M-}$ chambers.

The desalination system 102 further comprises a desalination subsystem 160, such as an RO or NF subsystem, that is fluidly coupled to the feed tank 110; a multivalent ion pair salt precipitating subsystem (hereinafter the "salt precipitating subsystem") 170 that is fluidly coupled to the stack 150 and to the $C^{M+}$ and $C^{M-}$ circuits, and a monovalent ion species-recovering electrodialysis stack (hereinafter the "monovalent ion species-recovering stack") 180 that is fluidly coupled to the salt precipitating subsystem 170. In some embodiments, the desalination subsystem 160 may improve the desalination efficiency of the system 102 in terms of the quality and the percentage of recovered water discharged from the system 102. The desalination subsystem 160 may also improve the electrodialysis efficiency of the stack 150 by keeping the salt ion content in the feed water that is input to the stack 150 in a certain concentration range. While the desalination system 102 is illustrated in FIG. 1 in a batch-processing mode, in an alternative embodiment (not depicted) it may be operated in a "once through" continuous mode by controlling suitable valves, conduits, and pumps.

The input saltwater is fed via an input conduit 104 to the feed tank 110. During operation, at least four saltwater streams are directed to the stack 150: the feed water via a conduit 111; the $C^{M-}$ solution, for receiving multivalent anions, via a conduit 121; the transfer solution T, containing monovalent ion species, via a conduit 131; and the $C^{M+}$ solution, for receiving multivalent cations, via a conduit 141. The stack 150 removes from the feed water multivalent and monovalent ion species, thereby desalinating the feed water and generating the product water. Simultaneously, the stack 150 also concentrates multivalent anions into the $C^{M-}$ solution, and concentrates multivalent cations into the $C^{M+}$ solution. The transfer solution during the desalination process serves as an intermediate medium for ion-transfer and balances its ion-charge neutrality by receiving and transferring out the same molar equivalent of ions with the same charges. After exiting the stack 150, the product water flows through a conduit 112 to feed tank 110; the $C^{M-}$ solution flows through a conduit 122, valve 123, and a conduit 124 to the $C^{M-}$ tank 120, the transfer solution flows through a conduit 132 back to the T tank 130; and the $C^{M+}$ solution flows through a conduit 142, valve 143, and a conduit 144 to the $C^{M+}$ tank 140.

The product water in the feed tank 110 is discharged from the system 102 through conduits 113,161, or may be further desalinated before discharge by the desalination subsystem 160. The desalination subsystem 160 produces desalinated permeate that is discharged from the system 102 through a discharge conduit 161. The concentrated brine rejected by the desalination subsystem 160 is returned via a conduit 162 to the feed tank 110 and mixed there with the input saltwater or product water for further treatment by the stack 150. While in one example embodiment the desalination subsystem 160 is an RO subsystem, in alternative embodiments the desalination subsystem 160 may be any of an electrodialysis desalinator device, a forward osmosis device, a nanofiltration desalinator device, a membrane distillation desalinator device, and a thermal evaporation desalinator device, or any suitable combination of two or more of the foregoing devices. The stack 150 removes multivalent ion pairs (multivalent cations and multivalent anions) such that the concentration of these pairs is low enough that they do not pose an unacceptable scaling danger to the desalination subsystem 160 due to their low solubility limits. In order to increase water recovery, the concentrated multivalent anion solution in the $C^{M-}$ tank 120 and the concentrated multivalent cation solution in the $C^{M+}$ tank 140 may be recirculated through the stack 150 and be concentrated well below their solubility limits at the system's 102 operating temperature. The concentrated multivalent anion solution, via a control valve 125 and a conduit 126, and the concentrated multivalent cation solution, via a control valve 145 and a conduit 146, may then be routed to the salt precipitating subsystem 170, producing precipitates of multivalent ion species, such as $CaSO_4$. Those precipitates may be discharged from the system 102 via an output conduit 171. Alternatively, the concentrated multivalent anion solution in the $C^{M-}$ tank 120 and the concentrated multivalent cation solution in the $C^{M+}$ tank 140 may be recovered for other industrial uses or be discharged directly from the desalination system 102.

The reaction in the salt precipitating subsystem 170 also produces a saltwater comprising monovalent ion species and multivalent ions, which may be supplied via a conduit 172 to the monovalent ion species-recovering electrodialysis stack 180. The stack 180 is described in more detail in respect of FIG. 6 below. To recover monovalent ion species, a solution without one or both of multivalent cations and multivalent anions is supplied via a conduit 181 to the stack 180. The stack 180 separates and recovers monovalent ion species out of the saltwater from the precipitating subsystem 170, producing a saltwater rich in monovalent ion species (hereafter the "monovalent ion brine") and a saltwater rich in multivalent ions (hereinafter the "multivalent ion brine"). The multivalent ion brine may be supplied via a conduit 183 to the feed tank 110. The monovalent ion brine may be supplied via a conduit 182 to the $C^{M-}$ tank 120 when the stack 150 of FIG. 2 or 3 is used, or to the $C^{M+}$ tank 140 when the stack 150 of FIG. 4 or 5 is used.

FIG. 2 shows a schematic of the stack 202 as one embodiment of the apparatus for multivalent ion desalination, shown as the stack 150 of FIG. 1. The feed water from the conduit 111 in FIG. 1 is supplied to the stack 202 and its product chambers (hereinafter the "P-chambers") 210; the solution exits the P-chambers via a conduit 112 as product water. The $C^{M-}$ solution is supplied from the conduit 121 of FIG. 1 to the stack 202 and its $C^{M-}$ chambers (hereinafter interchangeably referred to as the "multivalent anion concentrating chambers") 220, the $C^{M-}$ solution exits the $C^{M-}$ chambers 220 via the conduit 122 of FIG. 1. The transfer solution, containing monovalent ion species, is supplied from the conduit 131 shown in FIG. 1 to the stack 202 and its transfer chambers (hereinafter interchangeably referred to as the "T-chambers") 235,236. The transfer solution exits the T-chambers 235,236 via the conduit 132 of FIG. 1. The $C^{M+}$ solution is supplied via a conduit 141 of FIG. 1 to the stack 202 and its $C^{M+}$ chambers (hereinafter interchangeably referred to as the multivalent cation concentrating chambers). The $C^{M+}$ solution exits the $C^{M+}$ chambers 240 via the conduit 142 of FIG. 1.

On each end of stack 202 are electrolyte chambers 256, 257. An electrolyte solution in an electrolyte tank (not shown in FIGS. 1 and 2) is pumped through an electrolyte distribution conduit 254 into the electrolyte chambers 256, 257 in parallel. The electrolyte solution flows back into the electrolyte tank in a closed loop process via an electrolyte return conduit 255. In an alternative embodiment (not shown), a series closed loop circuit may be used where the electrolyte solution flows in one direction through the second electrolyte chamber 256 and then through the first electrolyte chamber 257, or vice-versa. Example electrolytes may include aqueous sodium sulfate and aqueous potassium nitrate. During stack operation, a direct current power supply (not shown in FIGS. 1 and 2) applies an electric potential (voltage) across the cathode 258 and the anode 259 at the ends of the stack 202.

There are three types of ion exchange membranes separating the chambers of the stack 202: cation exchange membranes (each a "CEM") 206, anion exchange membranes (each an "AEM") 207, and monovalent anion permselective ion exchange membranes (each an "mAEMm") 208. The CEM 206 is permeable to multivalent and monovalent cations and is substantially impermeable to, and in some embodiments and depending on operating conditions entirely rejects, anions. The AEM 207 is permeable to multivalent and monovalent anions and is substantially impermeable to, and in some embodiments and depending on operating conditions entirely rejects, cations. The mAEMm 208 is permeable to monovalent anions, substantially less permeable to multivalent anions, and substantially impermeable to, and in some embodiments and depending on operating conditions entirely reject, cations (whether multivalent or monovalent). "Substantially less permeable" refers to the permeability ratio of monovalent anions to multivalent anions under the same concentrations being greater than 1, preferably being greater than 5, and more preferably being greater than 10. A suitable CEM 206 includes an Astom CMX™ and a Saltworks Ionflux™ CEM. A suitable AEM 207 includes an Astom AMX™ and a Saltworks Ionflux™ AEMs. A suitable mAEMm 208 includes an Astom ACS™ and a Saltworks Ionflux™ mAEMm.

The stack 202 comprises a cathodic electrolyte chamber 256 and an anodic electrolyte chamber 257. The cathodic electrolyte chamber 256 is bounded on a cathodic side by the cathode 258 and on its anodic side by a CEM 206 (the "cathodic electrolyte chamber CEM"). Analogously, the anodic electrolyte chamber 257 is bounded on an anodic side by the anode 259 and on its cathodic side by a CEM 206 (the "anodic electrolyte chamber CEM").

Adjacent to each of the electrolyte chambers 256,257, and separated from them by a cation exchange membrane 206, are a first end transfer solution chamber 235 and a second end transfer solution chamber 236. In the embodiment shown in FIG. 2 the transfer chamber 235 is separated from the neighboring $C^{M-}$ chamber 240 by one mAEMm 208, which ensures substantially no multivalent anions move from the transfer chamber 235 into the neighboring $C^{M+}$ chamber 240, and the other transfer chamber 236 is separated from its neighboring $C^{M-}$ chamber 220 by another mAEMm 208, which ensures substantially no multivalent anions move from the neighboring $C^{M-}$ chamber 220 to the transfer chamber 236. In an alternative embodiment, the transfer solution chamber 235 may be separated from its neighboring $C^{M+}$ chamber 240 by an AEM 207 when the transfer solution only comprises monovalent ion species. Besides being transition chambers for transporting ions between chambers, the transfer solution chambers 235,236 also protect the electrolyte chambers 256,257 from pollution by divalent scaling ions such as $Ca^{2+}$ and $Mg^{2+}$. A transfer solution may comprise conductive but non-scaling aqueous salts such as sodium chloride.

The stack 202 comprises one or more electrodialysis cells located between the cathode 258 and the anode 259, with each electrodialysis cell comprising the product chamber 210 for receiving the feed water, the $C^{M+}$ chamber 240 for receiving the $C^{M+}$ solution, and the $C^{M-}$ chamber 220 for receiving the $C^{M-}$ solution. In each of the electrodialysis cells, the product chamber 210 and the $C^{M+}$ chamber are each bounded by and share a CEM 206, while the product chamber 210 and the $C^{M-}$ chamber are each bounded by and share an AEM 207. The $C^{M+}$ chamber 240 is bounded by an mAEMm 208 on its cathodic side (this is a cathodic cell end ion exchange membrane) and the $C^{M-}$ chamber 220 is bounded by an mAEMm 208 on its anodic side (this is an anodic cell end ion exchange membrane).

The monovalent ion species addition subsystem 105 supplies one or more monovalent salts (for example NaCl) and/or one or more monovalent acids (for example HCl) to the $C^{M-}$ circuit in FIG. 1 so that the solution flowing in the $C^{M-}$ chambers 220 has sufficient monovalent anions permeating the mAEMm 208 to permit an ionic current to be conducted. For example, the monovalent ion species in the solution flowing in the $C^{M-}$ chambers 220 during stack operation may be kept above 500 mg/l, preferably above 1,000 mg/l, and more preferably above 2,000 mg/l.

When an electric potential (voltage) is applied across the cathode 258 and anode 259 and the stack 202 is in operation, multivalent and monovalent cations of the feed water flowing in the P-chamber 210 migrate through the CEM 206 bounding the cathodic side of the P-chamber 210 and into the $C^{M+}$ chamber 240, and multivalent and monovalent anions of the feed water flowing in the P-chamber 210 migrate through the AEM 207 bounding the anodic side of the P-chamber 210 and into the $C^{M-}$ chamber 220. Monovalent anions from the $C^{M-}$ solution flowing through the $C^{M-}$ chamber 220 migrate through the mAEMm 208 bounding the anodic side of the $C^{M-}$ chamber 220 and into the $C^{M+}$ chamber 240. The monovalent anions in the $C^{M-}$ solution may be received from the P-chamber 210 during electrodialysis, and additionally or alternatively may be supplied by the monovalent ion species addition subsystem 105. Multivalent anions combine with monovalent cations from the supplied monovalent ion species forming a salt comprising monovalent cations and multivalent anion in the $C^{M-}$ chamber 220, and multivalent cations combine with monovalent anions forming a salt comprising multivalent cation and monovalent anions in the $C^{M+}$ chamber 240. As a result of the electrodialysis process, the salt ion concentration in the feed water decreases in the P-chambers 210, the concentration of a salt comprising monovalent cations and multivalent anions increases in the $C^{M-}$ chambers 220, and the concentration of a salt comprising multivalent cations and monovalent anions increases in the $C^{M+}$ chambers 240. The fluid flowing in the $C^{M-}$ chambers 220 accordingly becomes a concentrated multivalent anion solution, and the fluid flowing in the $C^{M+}$ chamber 240 accordingly becomes a concentrated multivalent cation solution. The transfer solution in the T chambers 235,236 serves as a medium for ion-transfer and balances its ion-charge neutrality by receiving and transferring out the same molar equivalent of anions. The concentration of monovalent anions in the $C^{M-}$ chambers 220 decreases such that monovalent anions may be insufficient to permit an ionic current through the mAEMm's 208 to be conducted. The starving of monovalent anions in the $C^{M-}$ chambers 220 during operation may be evidenced by an increase in the electrical resistance of the stack 202. The increase of the stack 202's electrical resistance may accordingly serve as a signal for a control system managing the monovalent ion species addition subsystem.

In one embodiment of the system 102 that comprises the control system, the control system comprises an ohmmeter (not depicted) that is electrically coupled between the cathode 258 and anode 259 to measure the electrical resistance encountered by current flowing between the cathode 258 and anode 259. As mentioned above, resistance increases as monovalent anion concentration decreases in the $C^{M-}$ chambers 220. The control system also comprises a processor that is communicatively coupled to the ohmmeter and to the monovalent ion species addition subsystem 105 and a non-transitory computer readable medium that is communicatively coupled to the processor. The computer readable medium has stored on it program code that is executable by the processor and that, when executed by the processor, causes the processor to receive an electrical resistance measurement from the ohmmeter, determine whether the electrical resistance measurement exceeds a monovalent ion species addition threshold, and, when the electrical resistance measurement exceeds the monovalent ion species addition threshold, send a signal to the monovalent ion species addition subsystem 105 that causes the monovalent ion species addition subsystem 105 to increase a concentration of the monovalent ion species in at least one of the concentrating chambers of the stack 202. In the embodiment of the stack 202 shown in FIG. 2 in which the monovalent ion species addition subsystem 105 adds monovalent ion species to the solution flowing in the $C^{M-}$ chambers 220, the signal sent by the processor causes the monovalent ion species addition subsystem 105 to add monovalent ion species to the $C^{M-}$ tank 120.

In one embodiment, the processor determines whether the electrical resistance measurement exceeds the monovalent ion species addition threshold by comparing the electrical resistance measurement directly to the monovalent ion species addition threshold. In another embodiment, the processor determines whether the electrical resistance measurement exceeds the monovalent ion species addition threshold by determining whether a percentage change in a pair of electrical resistance measurements exceeds a percentage change threshold. More particularly, the processor receives a first and a second electrical resistance measurement from the ohmmeter at a first time a subsequent second time, respectively. The processor determines a percentage difference between the first and second electrical resistance measurements and compares that percentage difference to the percentage change threshold. When the percentage difference exceeds the percentage change threshold, the processor sends the signal to the monovalent ion species addition subsystem 105 to add monovalent ion species.

In embodiments in which the monovalent ion species addition subsystem 105 receives the signal from the processor and consequently adds monovalent ion species to the $C^{M-}$ tank 120, the monovalent ion species addition subsystem 105 is automated and may comprise, for example, a tank containing the monovalent ion species that is fluidly coupled to one or both of the tank 120 via automated valving, such as that comprising the control valve 107, that comprises a motor for opening and closing the valving in response to the signal from the processor. In different embodiments in which the monovalent ion species addition subsystem 105 is manually controlled, the processor may send a signal to a communication device such as a display that notifies a technician to add more monovalent ion species to the $C^{M-}$ tank 120.

FIG. 3 shows a schematic of another embodiment of the apparatus, shown as a stack 302. The feed water from the conduit 111 of FIG. 1 is supplied to stack 302 and its product chambers (hereinafter the "P-chambers") 310, the solution exits the P-chambers 310 via a conduit 112 as product water. The $C^{M-}$ solution is supplied from the conduit 121 of FIG. 1 to the stack 302 and its $C^{M-}$ chambers (hereinafter interchangeably referred to the "multivalent anion concentrating chambers") 320, and the $C^{M-}$ solution exits the $C^{M-}$ chambers 320 via the conduit 122 of FIG. 1. The transfer solution, containing monovalent ion species, is supplied from the conduit 131 of FIG. 1 to the stack 302 and its transfer chambers (hereinafter interchangeably referred to as the "T-chambers") 330,335,336. The transfer solution exits the T-chambers 330,335,336 via the conduit 132 of FIG. 1. The $C^{M+}$ solution is supplied to the stack 302 and its $C^{M+}$ chambers (hereinafter interchangeably referred to the "multivalent cation concentrating chambers") 340 via the conduit 141 of FIG. 1. The $C^{M+}$ solution exits the $C^{M+}$ chambers 340 via the conduit 142 of FIG. 1. In the embodiment shown in FIGS. 1 and 3, the two end T-chambers 335,336 and the middle T-chambers 330 share the transfer solution circuit (transfer solution tank 130 and conduits 131,132). In an alternative embodiment (not shown in FIGS. 1 and 3), two separate transfer solution circuits (tanks and conduits) supply T-solutions to the end T-chambers 335, 336 and to the middle T-chambers 330 independently.

On each end of stack 302 are electrolyte chambers 356, 357. An electrolyte solution in an electrolyte tank (not shown in FIGS. 1 and 3) is pumped through an electrolyte distribution conduit 354 into the electrolyte chambers 356, 357 in parallel. The electrolyte solution flows back into the electrolyte tank in a closed loop process via an electrolyte return conduit 355. In an alternative embodiment (not shown), a series closed loop circuit may be used where the electrolyte solution flows in one direction through the second electrolyte chamber 356 and then through the first electrolyte chamber 357, or vice-versa. Example electrolytes may include aqueous sodium sulfate and aqueous potassium nitrate. During stack operation, a direct current power supply (not shown in FIGS. 1 and 3) applies an electric potential (voltage) across the cathode 358 and the anode 359 at the ends of stack 302.

There are three types of ion exchange membranes separating the chambers of stack 302: cation exchange membrane 306 (each a "CEM"), anion exchange membrane 307 (each an "AEM"), and monovalent permselective anion exchange membrane 308 (each an "mAEMm"). The CEM 306 is permeable to multivalent and monovalent cations and is substantially impermeable to, and in some embodiments and depending on operating conditions entirely rejects, anions. The AEM 307 is permeable to multivalent and monovalent anions and is substantially impermeable to, and in some embodiments and depending on operating conditions entirely rejects, cations. The mAEMm 308 is permeable to monovalent anions, substantially less permeable to multivalent anions, and substantially impermeable to, and in some embodiments and depending on operating conditions entirely reject, cations (whether multivalent or monovalent). "Substantially less permeable" refers to the permeability ratio of monovalent anions to multivalent anions under the same concentrations being greater than 1, preferably being greater than 5, more preferably being greater than 10. A suitable CEM 306 includes an Astom CMX™ and a Saltworks Ionflux™ CEM. A suitable AEM 307 includes an Astom AMX™ and a Saltworks Ionflux™ AEM. A suitable mAEMm 308 includes an Astom ACS™ and a Saltworks Ionflux™ mAEMm.

The stack 302 comprises a cathodic electrolyte chamber 356 and an anodic electrolyte chamber 357. The cathodic electrolyte chamber 356 is bounded on a cathodic side by the cathode 358 and on its anodic side by a CEM 306 (the "cathodic electrolyte chamber CEM"). Analogously, the anodic electrolyte chamber 357 is bounded on an anodic side by the anode 359 and on its cathodic side by a CEM 306 (the "anodic electrolyte chamber CEM").

Adjacent to each of the electrolyte chambers 356,357, and separated from them by a cation exchange membrane 306, are a first end transfer solution chamber 335 and a second end transfer solution chamber 336. In the embodiment shown in FIG. 3 the end transfer chamber 335 is separated from its neighboring transfer chamber 330 by one mAEMm 308, which ensures substantially no multivalent anions move from the end transfer chamber 335 into the neighboring transfer chamber 330, and the other end transfer chamber 336 is separated from the neighboring $C^{M-}$ chamber 320 by another mAEMm 308 which ensures substantially no multivalent anions move from the $C^{M-}$ chamber 320 to the end transfer chamber 336. In an alternative embodiment, the end transfer solution chamber 335 may be separated from its neighboring transfer chamber 330 by an AEM 307 when the transfer solution only comprises monovalent ion species. Besides being transfer chambers for transporting ions between chambers, the end transfer solution chambers 335, 336 also protect the electrolyte chambers 356,357 from pollution by divalent scaling ions such as $Ca^{2+}$ and $Mg^{2+}$. A transfer solution may comprise conductive but non-scaling aqueous salts such as sodium chloride.

The stack 302 comprises one or more electrodialysis cells located between the cathode 358 and the anode 359, with each electrodialysis cell comprising the product chamber 310 for receiving the feed water, the $C^{M+}$ chamber 340 for receiving the $C^{M+}$ solution, the $C^{M-}$ chamber 320 for receiving the $C^{M-}$ solution, and the T-chamber 330 for receiving the transfer solution. In each of the electrodialysis cells, the product chamber 310 and the $C^{M+}$ chamber 340 are each bounded by and share a CEM 306, while the product chamber 310 and the $C^{M-}$ chamber 320 are each bounded by and share an AEM 307. Different from the stack 202 of FIG. 2, each of the electrodialysis cells of the stack 302 of FIG. 3 further comprises a T-chamber 330 bounded by an mAEMm 308 on the cathodic side and by one of an AEM 307 and an mAEMm 308 on the anodic side. The $C^{M-}$ chamber 320 and the T-chamber 330 are each bounded by and share an mAEMm 308. In the embodiment shown in FIG. 3 the T chamber 330 and the $C^{M+}$ chamber 340 are each bounded by and share an AEM 307. In an alternative embodiment (not depicted), the T-chamber 330 and the $C^{M+}$ chamber 340 may each be bounded by and share an mAEMm 308. Each cell accordingly comprises identical types of ion exchange membranes, either an AEM 307 or an mAEMm 308, at its cathodic and anodic ends (these membranes are "cell end ion exchange membranes").

A monovalent ion species addition subsystem 105 supplies one or more monovalent salts (for example NaCl) and/or one or more monovalent acids (for example HCl) to $C^{M-}$ circuit in FIG. 1 that the solution flowing in the $C^{M-}$ chamber 320 has sufficient monovalent anions permeating the mAEMm 308 to permit an ionic current to be conducted. For example, the monovalent ion species in the solution flowing in the $C^{M-}$ chambers 320 during stack operation may be kept above 500 mg/l, preferably above 1,000 mg/l, and more preferably above 2,000 mg/l.

When an electric potential (voltage) is applied across the cathode 358 and anode 359 and the stack 302 is in operation, multivalent and monovalent cations in the feed water flowing in the P-chamber 310 migrate through the CEM 306 bounding the cathodic side of the P-chamber 310 and into the $C^{M+}$ chamber 340, and multivalent and monovalent anions in the feed water flowing in the P-chamber 310 migrate through the AEM 307 bounding the anodic side of the P-chamber 310 and into the $C^{M-}$ chamber 320. Monovalent anions from the $C^{M-}$ solution flowing through the $C^{M-}$ chamber 320 migrate through the mAEMm 308 bounding the anodic side of the $C^{M-}$ chamber 320 and into the T chamber 330. The monovalent anions in the $C^{M-}$ chamber 320 may be received from the P-chamber 310 during electrodialysis, and additionally or alternatively may be supplied by the monovalent ion species addition subsystem 105. Multivalent anions in the $C^{M-}$ solution however cannot permeate the mAEMm 308 and consequently stay in the $C^{M-}$ chamber 320. Multivalent anions combine with monovalent cations from the supplied monovalent ion species thereby forming in the $C^{M-}$ chamber 320 a salt comprising monovalent cations and a multivalent anion. In the T chamber 330, monovalent anions, which may be from the $C^{M-}$ chamber 320 or from the transfer electrolyte that comprises monovalent ion species, migrate through the AEM 307 bounding the anodic side of the T chamber 330 and into the $C^{M+}$ chamber 340. The multivalent cations and monovalent anions in the $C^{M+}$ chamber 340 form salts comprising a multivalent cation and monovalent anions. As a result of the electrodialysis process, the concentration of salt ions in the feed water decreases in the P-chamber 310, the concentration of a salt comprising monovalent cations and a multivalent anion increases in the $C^{M-}$ chamber 320, and the concentration of a salt comprising a multivalent cation and monovalent anions increases in the $C^{M+}$ chamber 340. The transfer solution in the T chamber only serves as an intermediate medium for ion-transfer and balances its ion-charge neutrality by receiving and transferring out the same molar equivalent of anions. The $C^{M-}$ solution becomes a concentrated multivalent anion solution, and the $C^{M+}$ solution becomes a concentrated multivalent cation solution. The concentration of monovalent anions in the $C^{M-}$ chamber 320 decreases such that monovalent anions may be insufficient to permit an ionic current through mAEMm 308 to be conducted. The starving of monovalent anions in the $C^{M-}$ chambers 320 during operation may be evidenced by an increase in the electrical resistance of stack 302. The increase of stack 302's electrical resistance may accordingly serve as a signal for a control system (not depicted) managing the monovalent ion species addition subsystem. The increase of the stack 302's electrical resistance may accordingly serve as a signal for a control system managing the monovalent ion species addition subsystem as described above in respect of FIG. 2.

Providing a transfer chamber 330 in each electrodialysis cell such that a transfer chamber 330 is between the $C^{M+}$ chamber 340 and the $C^{M-}$ chamber 320 in the stack 302 may help prevent possible scaling issues caused by internal leakage (for example leakage caused by membrane pinholes or bad sealing) between the $C^{M+}$ chamber 340 and the $C^{M-}$ chamber 320. When the internal leakage takes place, the transfer solution flowing in the transfer chamber 330 may be refreshed partially or completely with a makeup transfer solution to mitigate the scaling issues. The stack 302 may also be operated in a mode of electrodialysis reversal to remove scaling build-up on membrane surfaces by switching the polarity of the potential applying to electrodes 358,359 while simultaneously swapping the fluids flowing between the P-chamber 310 and the $C^{M+}$ chamber 340, and swapping the fluids flowing between the $C^{M-}$ chamber 320 and the T chamber 330.

FIG. 4 shows a schematic of another embodiment of the apparatus in the form of a stack 402. The feed water from the conduit 111 of FIG. 1 is supplied to the stack 402 and its product chambers (hereinafter the "P-chambers") 410; the solution exits the P-chambers 410 via the conduit 112 as product water. The $C^{M-}$ solution from the conduit 121 of FIG. 1 is supplied to the stack 402 and its $C^{M-}$ chambers (hereinafter interchangeably referred to as the "multivalent anion concentrating chambers") 420, and the $C^{M-}$ solution exits the $C^{M-}$ chambers 420 via the conduit 122 of FIG. 1. The transfer solution, containing monovalent ion species, is supplied from the conduit 131 of FIG. 1 to the stack 402 and its transfer chambers (hereinafter the "T-chambers") 435 and 436, the transfer solution exits the T-chambers 435,436 via the conduit 132 of FIG. 1. The $C^{M+}$ solution from the conduit 141 of FIG. 1 is supplied to the stack 402 and its $C^{M+}$ chambers (hereinafter interchangeably referred to as the "multivalent cation concentrating chambers") 440, and the $C^{M+}$ solution exits the $C^{M+}$ chambers 440 via the conduit 142 of FIG. 1.

On each end of the stack 402 are electrolyte chambers 456,457. An electrolyte solution in an electrolyte tank (not shown in FIGS. 1 and 4) is pumped through an electrolyte distribution conduit 454 into the electrolyte chambers 456, 457 in parallel. The electrolyte solution flows back into the electrolyte tank in a closed loop process via an electrolyte return conduit 455. In an alternative embodiment (not shown), a series closed loop circuit may be used where the electrolyte solution flows in one direction through the second electrolyte chamber 456 and then through the first electrolyte chamber 457, or vice-versa. Example electrolytes may include aqueous sodium sulfate and aqueous potassium nitrate. During stack operation, a direct current power supply (not shown in FIGS. 1 and 4) applies an electric potential (voltage) across the cathode 458 and anode 459 at the ends of the stack 402.

There are three types of ion exchange membranes separating the chambers of the stack 402: cation exchange membrane (each a "CEM") 406, anion exchange membrane (each an "AEM") 407 and monovalent cation permselective ion exchange membrane (each an "mCEMm") 408. The CEM 406 is permeable to multivalent and monovalent cations and is substantially impermeable to, and in some embodiments and depending on operating conditions entirely rejects, anions. The AEM 407 is permeable to multivalent and monovalent anions and is substantially impermeable to, and in some embodiments and depending on operating conditions entirely rejects, cations. The mCEMm 408 is permeable to monovalent cations, substantially less permeable to multivalent cations, and substantially impermeable to, and in some embodiments and depending on operating conditions entirely rejects, anions (whether multivalent or monovalent). "Substantially less permeable" refers to the permeability ratio of monovalent cations to multivalent cations under the same concentrations being greater than 1, preferably being greater than 5, and more preferably being greater than 10. A suitable CEM 406 includes an Astom CMX™ and a Saltworks Ionflux™ CEM. A suitable AEM 407 includes an Astom AMX™ and a Saltworks Ionflux™ AEM. An suitable mCEMm 408 includes an Astom CMS™ and a Saltworks Ionflux™ mCEMm.

The stack 402 comprises a cathodic electrolyte chamber 456 and an anodic electrolyte chamber 457. The cathodic electrolyte chamber 456 is bounded on a cathodic side by the cathode 458 and on its anodic side by a CEM 406 (the "cathodic electrolyte chamber CEM"). Analogously, the anodic electrolyte chamber 457 is bounded on an anodic side by the anode 459 and on its cathodic side by a CEM 406 (the "anodic electrolyte chamber CEM").

Adjacent to each of the electrolyte chambers 456,457, and separated from them by a cation exchange membrane 406, are a first end transfer solution chamber 435 and a second end transfer solution chamber 436. In the embodiment shown in FIG. 4 the end transfer chamber 435 is separated from its neighboring $C^{M+}$ chamber 440 by one mCEMm 408 which ensures substantially no multivalent cations move from the neighboring $C^{M+}$ chamber 440 to the end transfer chamber 435, and the end transfer chamber 436 is separated from its neighboring $C^{M-}$ chamber 420 by another mCEMm 408, which ensures substantially no multivalent cations move from the other end transfer chamber 436 into the neighboring $C^{M-}$ chamber 420. In an alternative embodiment, the end transfer solution chamber 436 may be separated from the neighboring $C^{M-}$ chamber 420 by a CEM 406 when the transfer solution only comprises monovalent ion species. Besides being transition chambers for transporting ions between chambers, the transfer solution chambers 435, 436 also protect the electrolyte chambers 456,457 from pollution by divalent scaling ions such as $Ca^{2+}$ and $Mg^{2+}$. A transfer solution may comprise conductive but non-scaling aqueous salts such as sodium chloride.

The stack 402 comprises one or more electrodialysis cells located between the cathode 458 and the anode 459, with each electrodialysis cell comprising the product chamber 410 for receiving the feed water, the $C^{M+}$ chamber 440 for receiving $C^{M+}$ solution, and the $C^{M-}$ chamber 420 for receiving $C^{M-}$ solution. In each of the electrodialysis cells, the product chamber 410 and the $C^{M+}$ chamber are each bounded by and share a CEM 406, while the product chamber 410 and the $C^{M-}$ chamber are each bounded by and share an AEM 407. The $C^{M+}$ chamber 440 is bounded by an mCEMm 408 on its cathodic side (this is a cathodic cell end ion exchange membrane) and the $C^{M-}$ chamber 420 is bounded by an mCEMm on its anodic side (this is an anodic cell end ion exchange membrane).

The monovalent ion species addition subsystem 105 supplies one or more monovalent salts (for example NaCl) and/or one or more monovalent acids (for example HCl) to $C^{M+}$ circuit in FIG. 1 so that the solution flowing in the $C^{M+}$ chambers 440 has sufficient monovalent cation permeating the mCEMm 408 to permit an ionic current to be conducted. For example, the monovalent ion species in the solution flowing in the $C^{M+}$ chambers 440 during stack operation may be kept above 500 mg/l, preferably above 1,000 mg/l, and more preferably above 2,000 mg/l.

When an electric potential (voltage) is applied across the cathode 458 and the anode 459 and the stack 402 is in operation, multivalent and monovalent cations of the feed water flowing in the P-chamber 410 migrate through the CEM 406 bounding the cathodic side of the P-chamber 410 and into the $C^{M+}$ chamber 440, and multivalent and monovalent anions of the feed water flowing in the P-chamber 410 migrate through the AEM 407 bounding the anodic side of the P-chamber 410 and into the $C^{M-}$ chamber 420. Monovalent cations from the $C^{M+}$ solution flowing through the $C^{M+}$ chamber 440 migrate through the mCEMm 408 bounding the cathodic side of the $C^{M+}$ chamber 440 and into the $C^{M-}$ chamber 420. The monovalent cations in the $C^{M+}$ chambers 440 may be received from the P-chamber 410 during electrodialysis, and additionally or alternatively may be from the monovalent ion species addition subsystem 105. Multivalent anions combine with monovalent cations forming a salt comprising monovalent cations and a multivalent anion in the $C^{M-}$ chamber 420, and multivalent cations combine with monovalent anions from the supplied monovalent ion species forming a salt comprising a multivalent cation and monovalent anions in the $C^{M+}$ chamber 440. As a result of the electrodialysis process, the salt ion concentration in the feed water decreases in the P-chamber 410, the concentration of a salt comprising monovalent cations and a multivalent anion increases in the $C^{M-}$ chamber 420, and the concentration of a salt comprising a multivalent cation and monovalent anions increases in the $C^{M+}$ chamber 440. The $C^{M-}$ solution becomes a concentrated multivalent anion solution, and the $C^{M+}$ solution becomes a concentrated multivalent cation solution. The transfer solution in the T chambers 235,236 serves as a medium for ion-transfer and balances its ion-charge neutrality by receiving and transferring out the same molar equivalent of cations. The concentration of monovalent cations from supplied monovalent ion species decreases in the $C^{M+}$ chamber 440 such that monovalent cations are insufficient to permit an ionic current through the mCEMm 408 to be conducted. The starving of monovalent cations in the $C^{M+}$ chambers 440 during operation may be evidenced by an increase in the electrical resistance of the stack 402. The increase of stack 402's electrical resistance may accordingly serve as a signal for a control system managing the monovalent ion species addition subsystem in a manner analogous to that described in respect of the embodiment of the stack 250 shown in FIG. 2. In contrast to the stack 250 of FIG. 2, in the embodiment of the stack 450 of FIG. 4 the monovalent ion species addition subsystem 105 adds monovalent ion species to the solution flowing in the $C^{M+}$ chambers 220, and the signal sent by the processor causes the monovalent ion species addition subsystem 105 to add monovalent ion species to the $C^{M+}$ tank 120.

FIG. 5 shows a schematic of another embodiment of the apparatus as a stack 502. The feed water from the conduit 111 of FIG. 1 is supplied to the stack 502 and its product chambers (hereinafter the "P-chambers") 510, and the water exits the P-chambers 510 via the conduit 112 of FIG. 1 as product water. The $C^{M-}$ solution is supplied from the conduit 121 of FIG. 1 to the stack 502 and its $C^{M-}$ chambers (hereinafter interchangeably referred to as the "multivalent anion concentrating chambers") 520, the $C^{M-}$ solution exits the $C^{M-}$ chambers 520 via the conduit 122 of FIG. 1. The transfer solution, containing monovalent ion species, is supplied from the conduit 131 of FIG. 1 to the stack 502 and its transfer chambers (hereinafter the "T-chambers") 530, 535,536 via the conduit 130 of FIG. 1, and the transfer solution exits the T-chambers 530,535,536 via the conduit 132 of FIG. 1. The $C^{M+}$ solution is supplied from the conduit 141 of FIG. 1 to the stack 502 and its $C^{M+}$ chambers (hereinafter interchangeably referred to as the "multivalent cation concentrating chambers") 540, and the $C^{M+}$ solution exits $C^{M+}$ chambers 540 via the conduit 142 of FIG. 1. In the embodiments shown in FIGS. 1 and 5, the two end T-chambers 535,536 and the middle T-chambers 530 share the transfer solution circuit (T-tank 130 and conduits 131,132). In an alternative embodiment (not depicted), two separate transfer solution circuits (tanks and conduits) supply transfer solutions to the end T-chambers 535,536 and to the middle T-chambers 530 independently.

On each end of the stack 502 are electrolyte chambers 556,557. An electrolyte solution in an electrolyte tank (not depicted) is pumped through an electrolyte distribution conduit 554 into the electrolyte chambers 556,557 in parallel. The electrolyte solution flows back into the electrolyte tank in a closed loop process via an electrolyte return conduit 555. In an alternative embodiment (not shown), a series closed loop circuit may be used where the electrolyte solution flows in one direction through the second electrolyte chamber 556 and then through the first electrolyte chamber 557, or vice versa. Example electrolytes may include aqueous sodium sulfate and aqueous potassium nitrate. During stack operation, a direct current power supplier (not shown in FIGS. 1 and 5) applies an electric potential (voltage) across the cathode 558 and the anode 559 at the ends of the stack 502.

There are three types of ion exchange membranes separating the chambers of the stack 502: cation exchange membrane (each a "CEM") 506, anion exchange membrane (each an "AEM") 507, and monovalent cation permselective ion exchange membrane (each an "mCEMm") 508. The CEM 506 is permeable to multivalent and monovalent cations and is substantially impermeable to, and in some embodiments and depending on operating conditions entirely rejects, anions. The AEM 507 is permeable to multivalent and monovalent anions and is substantially impermeable to, and in some embodiments and depending on operating conditions entirely rejects, cations. The mCEMm 508 is permeable to monovalent cations, substantially less permeable to multivalent cations, and substantially impermeable to, and in some embodiments and depending on operating conditions entirely rejects, anions (whether multivalent or monovalent). "Substantially less permeable" refers to the permeability ratio of monovalent cations to multivalent cations under the same concentrations being greater than 1, preferably being greater than 5, and more preferably being greater than 10. A suitable CEM 506 includes an Astom CMX™ and a Saltworks Ionflux™ CEM. A suitable AEM 507 includes an Astom AMX™ and a Saltworks Ionflux™ AEM. A suitable mCEMm 508 includes an Astom CMS™ and a Saltworks Ionflux™ mCEMm.

The stack 502 comprises a cathodic electrolyte chamber 556 and an anodic electrolyte chamber 557. The cathodic electrolyte chamber 556 is bounded on a cathodic side by the cathode 558 and on its anodic side by a CEM 506 (the "cathodic electrolyte chamber CEM"). Analogously, the anodic electrolyte chamber 557 is bounded on an anodic side by the anode 559 and on its cathodic side by a CEM 506 (the "anodic electrolyte chamber CEM").

Adjacent to each of the electrolyte chambers 556,557, and separated from them by a cation exchange membrane 506, are a first end transfer solution chamber 535 and a second end transfer solution chamber 536. In the embodiment shown in FIG. 5 the transfer chamber 535 is separated from its neighboring $C^{M+}$ chamber 540 by one mCEMm 508 which ensures substantially no multivalent cations move from the neighboring $C^{M+}$ chamber 540 to the first end transfer chamber 535, and the second end transfer chamber 536 is separated from its neighboring transfer chamber 530 by another mCEMm 508 which ensures substantially no multivalent cations move from the second end transfer chamber 536 into the neighboring transfer chamber 530. In an alternative embodiment, the second end transfer solution chamber 536 may be separated from its neighboring transfer chamber 530 by a CEM 506 when the transfer solution only comprises monovalent ion species. Besides being transition chambers for transferring ions between chambers, the end transfer solution chambers 535,536 also protect the electrolyte chambers 556,557 from pollution by divalent scaling ions such as $Ca^{2+}$ and $Mg^{2+}$. A transfer solution may comprise conductive but non-scaling aqueous salts such as sodium chloride.

The stack 502 comprises one or more electrodialysis cells located between the cathode 558 and the anode 559, with each electrodialysis cell comprising the product chamber 510 for receiving the feed water, the $C^{M+}$ chamber 540 for receiving the $C^{M+}$ solution, the $C^{M-}$ chamber 520 for receiving the $C^{M-}$ solution, and the T chamber 530 for receiving the transfer solution. In each of the electrodialysis cells, the product chamber 510 and the $C^{M+}$ chamber 540 are each bounded by and share a CEM 506, while the product chamber 510 and the $C^{M-}$ chamber 520 are each bounded by and share an AEM 507. Different from the stack 402 of FIG. 4, each of the electrodialysis cells of the stack 502 further comprises a T chamber 530 bounded by an mCEMm 508 on its anodic side and by one of an CEM 506 and an mCEMm 508 on its cathodic side. The transfer chamber 530 and the $C^{M+}$ chamber 540 are each bounded by and share an mCEMm 508. In the embodiment shown in FIG. 5, the $C^{M-}$ chamber 520 and the T chamber 530 are each bounded by and share a CEM 506. In an alternative embodiment not shown in FIG. 5, the $C^{M-}$ chamber 520 and the T chamber 530 may be bounded by and share an mCEMm. Each cell accordingly comprises identical types of ion exchange membranes, either a CEM 506 or an mCEMm 508, at its cathodic and anodic ends (these membranes are "cell end ion exchange membranes").

The monovalent ion species addition subsystem 105 supplies one or more monovalent salts (for example NaCl) and/or one or more monovalent acids (for example HCl) to the $C^{M+}$ circuit in FIG. 1 so that the saltwater flowing in the $C^{M+}$ chambers 540 has sufficient monovalent cations permeating the mCEMm 508 to permit an ionic current to be conducted. For example, the monovalent ion species in the solution flowing in the $C^{M+}$ chambers 540 during stack operation may be kept above 500 mg/l, preferably above 1,000 mg/l, and more preferably above 2,000 mg/l.

When an electric potential (voltage) is applied across the cathode 558 and the anode 559 and the stack 502 is in operation, multivalent and monovalent cations in the feed water flowing in the P-chamber 510 migrate through the CEM 506 bounding the cathodic side of the P-chamber 510 and into the $C^{M+}$ chamber 540, and multivalent and monovalent anions in the feed water flowing in the P-chamber 510 migrate through the AEM 507 bounding the anodic side of the P-chamber 510 and into the $C^{M-}$ chamber 520. Monovalent cations in the $C^{M+}$ chamber 540 migrate through the mCEMm 508 bounding the cathodic side of the $C^{M+}$ chamber 540 and into the T chamber 530. The monovalent cations in the $C^{M+}$ chambers 540 may be from P-chamber 510, and additionally or alternatively may be supplied by the monovalent ion species addition subsystem 105. Multivalent cations in the $C^{M+}$ chambers 540 however cannot permeate the mCEMm 508 and consequently stay in $C^{M+}$ chamber 540. Multivalent cations combine with monovalent anions from the supplied monovalent ion species forming in the $C^{M+}$ chamber 540 a salt comprising multivalent cations and a monovalent anion. In the T chamber 530, monovalent cations, which may be received from the $C^{M+}$ chamber 540 or from the transfer solution that comprises monovalent ion species, migrate through the CEM 506 bounding the cathodic side of the T chamber 530 and into the $C^{M-}$ chamber 520. The received monovalent cations and multivalent anions form in the $C^{M-}$ chamber 520 a salt comprising monovalent cations and a multivalent anion. As a result of the electrodialysis process, the concentration of salt ions in the feed water decreases in the P-chamber 510, the concentration of a salt comprising monovalent cations and a multivalent anion increases in the $C^{M-}$ chamber 520, and the concentration of a salt comprising a multivalent cation and monovalent anions increases in the $C^{M+}$ chamber 540. The transfer solution in T chambers 530 serves as a medium for ion-transfer and balances its ion-charge neutrality by receiving and transferring out the same molar equivalent of cations. The $C^{M-}$ solution flowing in the $C^{M-}$ chamber 520 becomes a concentrated multivalent anion solution, and the $C^{M+}$ solution flowing in the $C^{M+}$ chamber 540 becomes a concentrated multivalent cation solution. The concentration of monovalent cations from supplied monovalent ion species decreases in the $C^{M+}$ chamber 540 such that monovalent cations are insufficient to permit an ionic current through mCEMm 508 to be conducted. The starving of monovalent cations in the $C^{M+}$ chambers 540 during operation might be evidenced by an increase in the electrical resistance of the stack 502. The increase of the stack 502's electrical resistance may accordingly serve as a signal for a control system managing the monovalent ion species addition subsystem as described above in respect of FIG. 4.

Providing a transfer chamber in each electrodialysis cell such that a transfer chamber 530 is present between the $C^{M+}$ chamber 540 and the $C^{M-}$ chamber 520 of the stack 502 may help to prevent scaling caused by leakage within the stack 502 (for example, leakage caused by membrane pinholes or bad sealing) between the $C^{M+}$ chamber 540 and the $C^{M-}$ chamber 520. When the internal leakage takes place, the transfer solution flowing in the transfer chamber 530 may be refreshed partially or completely with a makeup transfer solution to mitigate the scaling issues. In certain embodiments, the stack 502 may be operated in a mode of electrodialysis reversal to remove scaling that has built up on membrane surfaces: switching the polarity of the potential applied to electrodes 558, 559 while simultaneously swapping i) the fluids flowing through the P-chambers 510 and $C^{M-}$ chambers 520, and ii) the fluids flowing through the $C^{M+}$ chambers 540 and T chambers 530.

Figure 6:
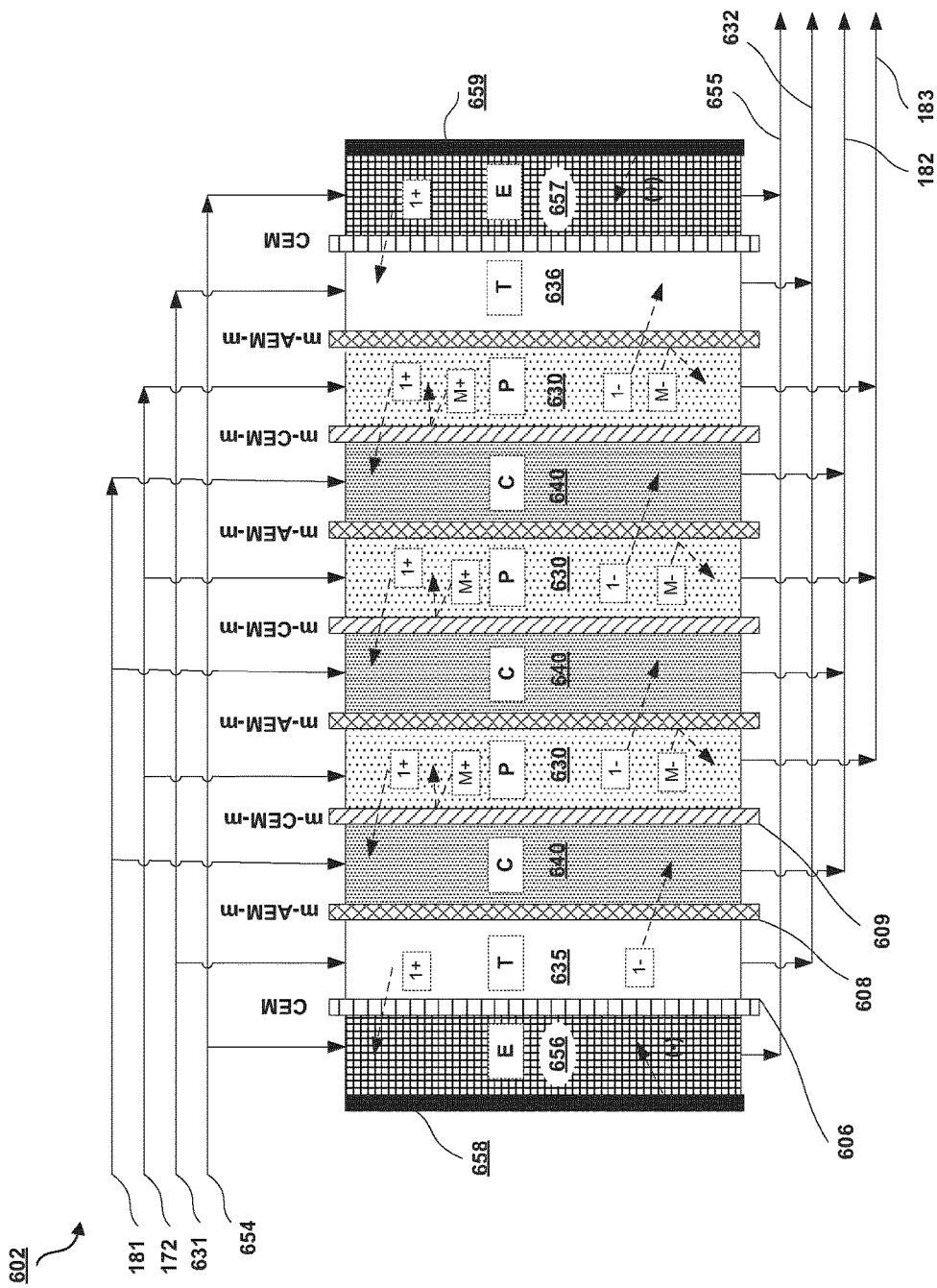
FIG. 6 shows a schematic of an example monovalent ion species-recovering electrodialysis device comprising part of the desalination system of FIG. 1.

FIG. 6 is a schematic of electrodialysis stack 602 as an embodiment of the monovalent ion species-recovering electrodialysis stack 180 of FIG. 1. It employs the same arrangement of electrodes 658,659, electrolyte chambers 656,657 and electrolyte conduits 654,655 as already described in respect of the stack 202. The transfer chambers 635,636 and transfer conduits 631,632 in the stack 602 are optional. Each of the transfer chambers 635,636 is separated from the electrolyte chambers 656,657 by a CEM 606. Between the transfer chambers 635,636, the stack 602 comprises an alternating series of mAEMm's 608 and mCEMm's 609, which define an alternating series of concentrating chambers (hereinafter the "C-chambers") 640 and product chambers (hereinafter the "P-chambers") 630. Two saltwater streams are fed to the stack 602: a saltwater without one or both of multivalent cations and multivalent anions is supplied via the conduit 181 to the stack 602 and its C-chambers 640; and the saltwater from the precipitating subsystem 170, comprising monovalent ion species and multivalent ions, is supplied via the conduit 172 to the stack 602 and its P-chambers 630. The mCEMm's 609 and mAEMm's 608 in the stack 602 operate together to separate and recover monovalent ion species from the saltwater from the precipitating subsystem 170 into the solution through the C-chambers 640 as a monovalent ion brine. Any remaining multivalent ions in the saltwater from the precipitating subsystem 170 are confined to the solution flowing through the P-chambers 630 as a multivalent ion brine. The multivalent ion brine may be supplied via the conduit 183 to the feed tank 110. The monovalent ion brine may be supplied via a conduit 182 to the $C^{M-}$ tank 120 when the stack 150 of FIG. 2 or 3 is used, or to the $C^{M+}$ tank 140 when the stack 150 presented of FIG. 4 or 5 is used. As with the stack 150 of FIGS. 2 through 5, the monovalent salt-concentrating stack 602 may be operated in an electrodialysis reversal mode to remove any membrane scalants that accumulate during operation.

The term "couple" and variants of it such as "coupled", "couples", and "coupling" as used in this disclosure are intended to include indirect and direct connections unless otherwise indicated. For example, if a first device is coupled to a second device, that coupling may be through a direct connection or through an indirect connection via other devices and connections.

Furthermore, the singular forms "a", "an", and "the" as used in this description are intended to include the plural forms as well, unless the context clearly indicates otherwise.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It is clear to any person skilled in the art that modification of and adjustments to the foregoing embodiments, not shown, are possible.

The invention claimed is:

1. A process for multivalent ion desalination, the process comprising:
(a) directing a feed water, a concentrated multivalent cation solution, and a concentrated multivalent anion solution through an apparatus comprising:
  (i) a cathode and an anode; and
  (ii) an electrodialysis cell located between the cathode and the anode, wherein the cell comprises a product chamber, a multivalent cation concentrating chamber on a cathodic side of the product chamber, and a multivalent anion concentrating chamber on an anodic side of the product chamber, wherein the product chamber and the multivalent cation concentrating chamber are each bounded by and share a cation exchange membrane and the product chamber and the multivalent anion concentrating chamber are each bounded by and share an anion exchange membrane,
    wherein the feed water flows through the product chamber, the concentrated multivalent cation solution flows through the multivalent cation concentrating chamber, and the concentrated multivalent anion solution flows through the multivalent anion concentrating chamber; and
(b) adding a monovalent ion species to at least one of the concentrated multivalent cation solution and the concentrated multivalent anion solution.

2. The process of claim 1 wherein a concentration of the monovalent ion species in the at least one of the concentrated multivalent cation and the concentrated multivalent anion solutions is kept above 500 mg/l.

3. The process of claim 1 wherein the apparatus comprises multiple electrodialysis cells, and wherein each of the cells comprises a cathodic and an anodic cell end ion exchange membrane respectively bounding a cathodic and an anodic end of the cell, wherein at least two of the cells are bounded by and share one of the cell end ion exchange membranes, and wherein the cell end ion exchange membranes of the at least two of the cells are identical types of ion exchange membranes.

4. The process of claim 3 wherein each of the cell end ion exchange membranes is a monovalent ion permselective ion exchange membrane.

5. The process of claim 4 wherein each of the cell end ion exchange membranes is a monovalent anion permselective ion exchange membrane.

6. The process of claim 5 wherein:
(a) at least one of the cells further comprises:
  (i) a cell transfer solution chamber located on a cathodic side of the multivalent cation concentrating chamber; and
  (ii) an anion exchange membrane that bounds a cathodic side of the multivalent cation concentrating chamber,
    wherein the cell transfer solution chamber is bounded on a cathodic side by one of the cell end monovalent anion permselective ion exchange membranes and on an anodic side by the anion exchange membrane that also bounds the cathodic side of the multivalent cation concentrating chamber; and
(b) the process further comprises directing a transfer solution comprising a monovalent ion species through the cell transfer solution chamber.

7. The process of claim 5 wherein:
(a) at least one of the cells further comprises:
  (i) a cell transfer solution chamber located on a cathodic side of the multivalent cation concentrating chamber; and
  (ii) a monovalent anion permselective ion exchange membrane that bounds a cathodic side of the multivalent cation concentrating chamber,
    wherein the cell transfer solution chamber is bounded on a cathodic side by one of the cell end monovalent anion permselective ion exchange membranes and on an anodic side by the monovalent anion permselective exchange membrane that also bounds the cathodic side of the multivalent cation concentrating chamber; and
(b) the process further comprises directing a transfer solution comprising a monovalent ion species through the cell transfer solution chamber.

8. The process of claim 4 wherein each of the cell end ion exchange membranes is a monovalent cation permselective ion exchange membrane.

9. The process of claim 8 wherein:
(a) at least one of the cells further comprises:
  (i) a cell transfer solution chamber located on an anodic side of the multivalent anion concentrating chamber; and
  (ii) a cation exchange membrane that bounds an anodic side of the multivalent anion concentrating chamber, wherein the cell transfer solution chamber is bounded on an anodic side by one of the cell end monovalent cation permselective ion exchange membranes and on a cathodic side by the cation exchange membrane that also bounds the anodic side of the multivalent anion concentrating chamber; and (b) the process further comprises directing a transfer solution comprising a monovalent ion species through the cell transfer solution chamber.

10. The process of claim 8 wherein:

(a) at least one of the cells further comprises:
  (i) a cell transfer solution chamber located on an anodic side of the multivalent anion concentrating chamber; and
  (ii) a monovalent cation permselective ion exchange membrane that bounds an anodic side of the multivalent anion concentrating chamber,
    wherein the cell transfer solution chamber is bounded on an anodic side by one of the cell end monovalent cation permselective ion exchange membranes and on a cathodic side by the monovalent cation permselective ion exchange membrane that also bounds the anodic side of the multivalent anion concentrating chamber; and (b) the process further comprises directing a transfer solution comprising a monovalent ion species through the cell transfer solution chamber.

11. The process of claim 3 wherein each of the cell end ion exchange membranes is an anion exchange membrane, and wherein:

(a) at least one of the cells further comprises:
  (i) a cell transfer solution chamber located on an anodic side of the multivalent anion concentrating chamber; and
  (ii) a monovalent anion permselective ion exchange membrane that bounds an anodic side of the multivalent anion concentrating chamber,
    wherein the cell transfer solution chamber is bounded on an anodic side by the anodic cell end anion exchange membrane and on a cathodic side by the monovalent anion permselective ion exchange membrane that also bounds the anodic side of the multivalent anion concentrating chamber; and (b) the process further comprises directing a transfer solution comprising a monovalent ion species through the cell transfer solution chamber.

12. The process of claim 3 wherein each of the cell end ion exchange membranes is a cation exchange membrane, and wherein:

(a) at least one of the cells further comprises:
  (i) a cell transfer solution chamber located on a cathodic side of the multivalent cation concentrating chamber; and
  (ii) a monovalent cation permselective ion exchange membrane that bounds a cathodic side of the multivalent cation concentrating chamber,
    wherein the cell transfer solution chamber is bounded on a cathodic side by the cathodic cell end cation exchange membrane and on an anodic side by the monovalent cation permselective ion exchange membrane that also bounds the cathodic side of the multivalent cation concentrating chamber; and (b) the process further comprises directing a transfer solution comprising a monovalent ion species through the cell transfer solution chamber.

13. The process of claim 1 further comprising precipitating multivalent ion species and producing a saltwater comprising monovalent ion species and multivalent ions from the concentrated multivalent cation solution and the concentrated multivalent anion solution exiting the multivalent cation concentrating chamber and the multivalent anion concentrating chamber, respectively.

14. The process of claim 13 further comprising:

(a) recovering monovalent ion species using a monovalent ion species-recovering electrodialysis stack by:
  (i) directing the saltwater comprising monovalent ion species and multivalent ions to the monovalent ion species-recovering stack;
  (ii) directing a saltwater without one or both of multivalent cations and multivalent anions to the monovalent ion species-recovering stack;
  (iii) outputting a monovalent ion brine comprising monovalent ion species from the monovalent ion species-recovering stack; and
  (iv) outputting a multivalent ion brine comprising multivalent ion; and (b) adding the monovalent ion brine to one of the concentrated multivalent cation solution and the concentrated multivalent anion solution.

15. The process of claim 1 further comprising desalinating via a desalination subsystem one or both of the feed water and a product water that exits the apparatus and that the apparatus generates by desalinating the feed water.

16. The process of claim 1 further comprising:

(a) obtaining an electrical resistance measurement that represents an electrical resistance between the anode and cathode;

(b) determining whether the electrical resistance exceeds a monovalent ion species addition threshold; and (c) when the electrical resistance measurement exceeds the monovalent ion species addition threshold, increasing a concentration of the monovalent ion species in at least one of the concentrating chambers of the apparatus.

17. A system for multivalent ion desalination, the system comprising:

(a) an apparatus, comprising:
  (i) a cathode and an anode;
  (ii) an electrodialysis cell located between the cathode and the anode, wherein the cell comprises a product chamber for receiving feed water, a multivalent cation concentrating chamber on a cathodic side of the product chamber, and a multivalent anion concentrating chamber on an anodic side of the product chamber, wherein the product chamber and the multivalent cation concentrating chamber are each bounded by and share a cation exchange membrane and the product chamber and the multivalent anion concentrating chamber are each bounded by and share an anion exchange membrane;

(b) a monovalent ion species addition subsystem that is fluidly coupled to and that adds a monovalent ion species to at least one of the multivalent cation and multivalent anion concentrating chambers of the apparatus.

18. The system of claim 17 wherein the monovalent ion species addition subsystem keeps a concentration of the monovalent ion species in the at least one of the multivalent cation and multivalent anion concentrating chambers above 500 mg/l.

19. The apparatus of claim 17 wherein the apparatus comprises multiple electrodialysis cells, and wherein each of the cells comprises a cathodic and an anodic cell end ion exchange membrane respectively bounding a cathodic and an anodic end of the cell, wherein at least two of the cells are bounded by and share one of the cell end ion exchange membranes, and wherein the cell end ion exchange membranes of the at least two of the cells are identical types of ion exchange membranes.

20. The apparatus of claim 19 wherein each of the cell end ion exchange membranes is a monovalent ion permselective ion exchange membrane.

21. The apparatus of claim 20 wherein each of the cell end ion exchange membranes is a monovalent anion permselective ion exchange membrane.

22. The apparatus of claim 21 wherein at least one of the cells further comprises:
(a) a cell transfer solution chamber located on a cathodic side of the multivalent cation concentrating chamber; and
(b) an anion exchange membrane that bounds a cathodic side of the multivalent cation concentrating chamber, wherein the cell transfer solution chamber is bounded on a cathodic side by one of the cell end monovalent anion permselective ion exchange membranes and on an anodic side by the anion exchange membrane that also bounds the cathodic side of the multivalent cation concentrating chamber.

23. The apparatus of claim 21 wherein at least one of the cells further comprises:
(a) a cell transfer solution chamber located on a cathodic side of the multivalent cation concentrating chamber; and
(b) a monovalent anion permselective ion exchange membrane that bounds a cathodic side of the multivalent cation concentrating chamber, wherein the cell transfer solution chamber is bounded on a cathodic side by one of the cell end monovalent anion permselective ion exchange membranes and on an anodic side by the monovalent anion permselective ion exchange membrane that also bounds the cathodic side of the multivalent cation concentrating chamber.

24. The apparatus of claim 20 wherein each of the cell end ion exchange membranes is a monovalent cation permselective ion exchange membrane.

25. The apparatus of claim 24 wherein at least one of the cells further comprises:
(a) a cell transfer solution chamber located on an anodic side of the multivalent anion concentrating chamber; and
(b) a cation exchange membrane that bounds an anodic side of the multivalent anion concentrating chamber, wherein the cell transfer solution chamber is bounded on an anodic side by one of the cell end monovalent cation permselective ion exchange membranes and on a cathodic side by the cation exchange membrane that also bounds the anodic side of the multivalent anion concentrating chamber.

26. The apparatus of claim 24 wherein at least one of the cells further comprises:
(a) a cell transfer solution chamber located on an anodic side of the multivalent anion concentrating chamber; and
(b) a monovalent cation permselective ion exchange membrane that bounds an anodic side of the multivalent anion concentrating chamber, wherein the cell transfer solution chamber is bounded on an anodic side by one of the cell end monovalent cation permselective ion exchange membranes and on a cathodic side by the monovalent cation permselective ion exchange membrane that also bounds the anodic side of the multivalent anion concentrating chamber.

27. The apparatus of claim 19 wherein each of the cell end ion exchange membranes is an anion exchange membrane, and wherein at least one of the cells further comprises:
(a) a cell transfer solution chamber located on an anodic side of the multivalent anion concentrating chamber; and
(b) a monovalent anion permselective ion exchange membrane that bounds an anodic side of the multivalent anion concentrating chamber, wherein the cell transfer solution chamber is bounded on an anodic side by the anodic cell end anion exchange membrane and on a cathodic side by the monovalent anion permselective ion exchange membrane that also bounds the anodic side of the multivalent anion concentrating chamber.

28. The apparatus of claim 19 wherein each of the cell end ion exchange membranes is a cation exchange membrane, and wherein at least one of the cells further comprises:
(a) a cell transfer solution chamber located on a cathodic side of the multivalent cation concentrating chamber; and
(b) a monovalent cation permselective ion exchange membrane that bounds a cathodic side of the multivalent cation concentrating chamber, wherein the cell transfer solution chamber is bounded on a cathodic side by the cathodic cell end cation exchange membrane and on an anodic side by the monovalent cation permselective ion exchange membrane that also bounds the cathodic side of the multivalent cation concentrating chamber.

29. The system of claim 17 further comprising a salt precipitating subsystem fluidly coupled to the multivalent anion concentrating chamber and the multivalent cation concentrating chamber of the apparatus, wherein the salt precipitating subsystem precipitates multivalent ion species and produces a saltwater comprising monovalent ion species and multivalent ions from solutions received from the concentrated multivalent anion and cation chambers of the apparatus.

30. The system of claim 29 further comprising a monovalent ion species-recovering stack fluidly coupled to the salt precipitating subsystem to receive the saltwater comprising monovalent ion species and multivalent ions and to a solution without one or both of multivalent cations and multivalent anions, wherein the monovalent ion species recovering stack outputs a monovalent ion brine comprising monovalent ion species and a multivalent ion brine comprising multivalent ions, wherein the monovalent ion brine is directed to one of the multivalent cation and multivalent anion concentrating chambers.

31. The system of claim 17 further comprising a desalination subsystem fluidly coupled to the product chamber to desalinate one or both of the feed water and a product water that exits the apparatus and that the apparatus generates by desalinating the feed water.

32. The system of claim 17 further comprising:
(a) an ohmmeter electrically coupled between the anode and the cathode;
(b) a processor communicatively coupled to the ohmmeter and to the monovalent ion species addition subsystem; and (c) a non-transitory computer readable medium communicatively coupled to the processor and having stored thereon program code that is executable by the processor and that, when executed by the processor, causes the processor to:
 (i) receive an electrical resistance measurement from the ohmmeter;
 (ii) determine whether the electrical resistance measurement exceeds a monovalent ion species addition threshold; and
 (iii) when the electrical resistance measurement exceeds the monovalent ion species addition threshold, send a signal to the monovalent ion species addition subsystem that causes the monovalent ion species addition subsystem to increase a concentration of the monovalent ion species in at least one of the concentrating chambers of the apparatus.

* * * * *